L. BAUMGARTL.
ART OF MANUFACTURING SLABS OR THE LIKE OF CEMENT OR LIKE MATERIAL.
APPLICATION FILED DEC. 30, 1918.
1,353,512.
Patented Sept. 21, 1920.
22 SHEETS—SHEET 6.
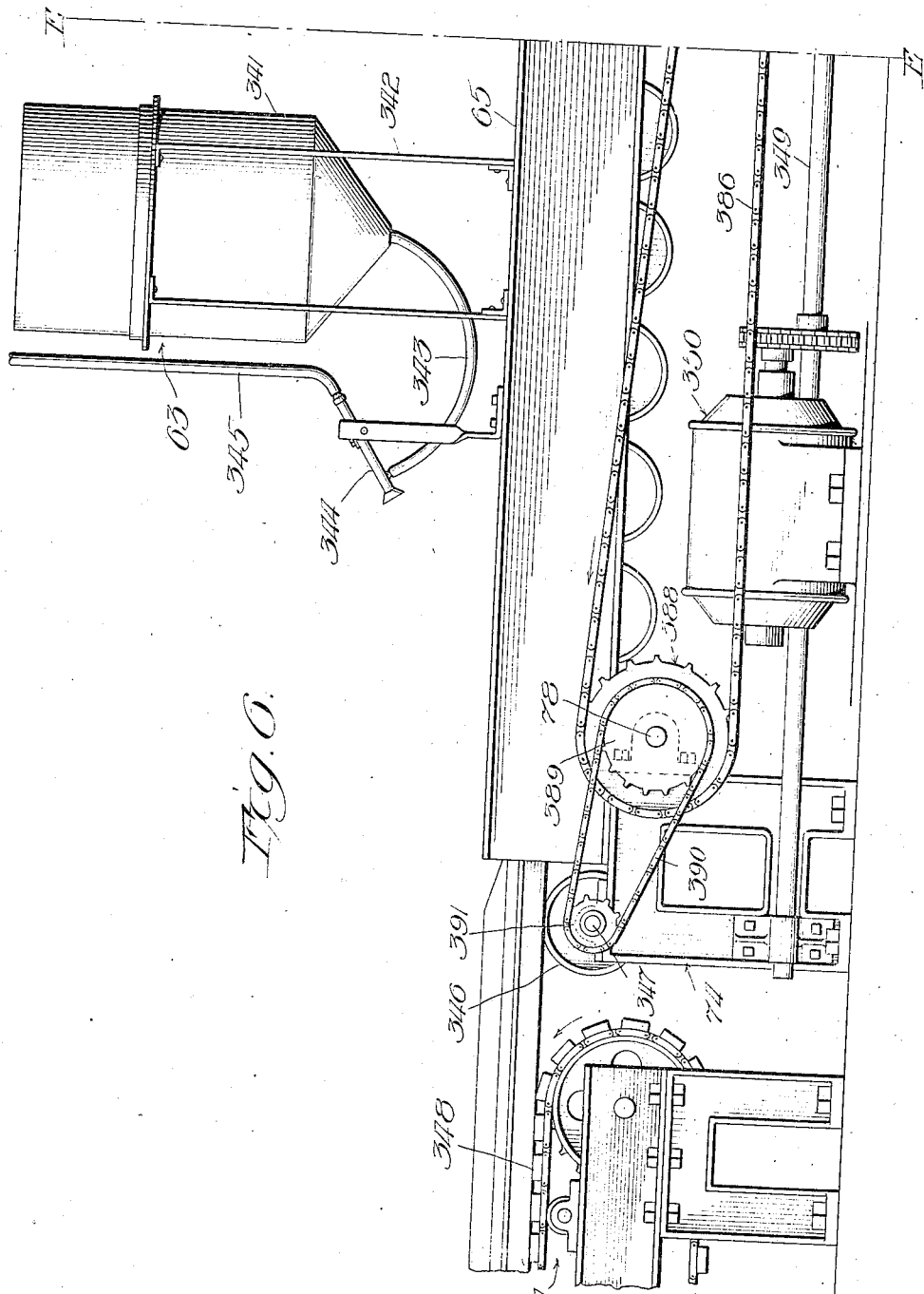

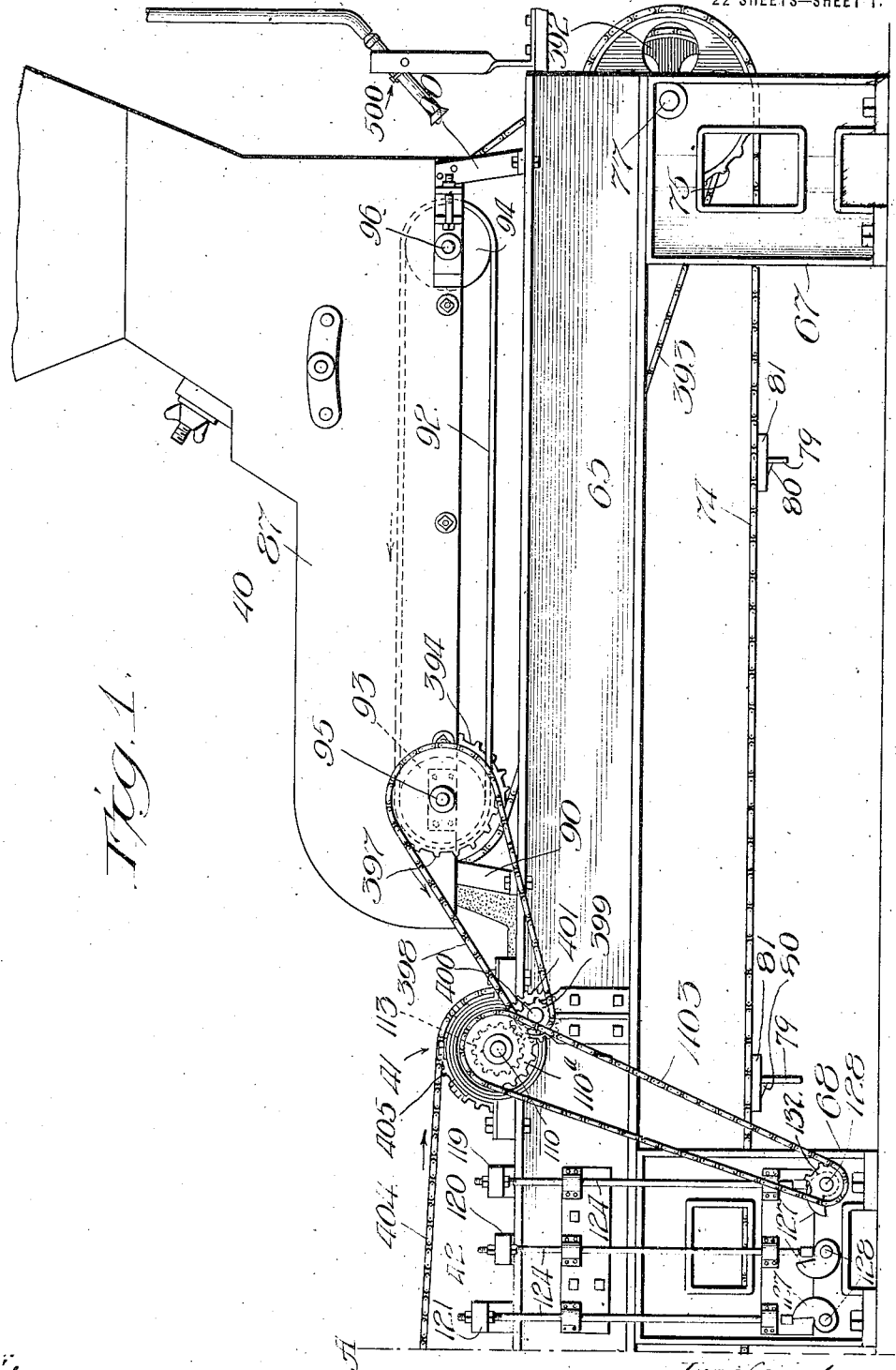

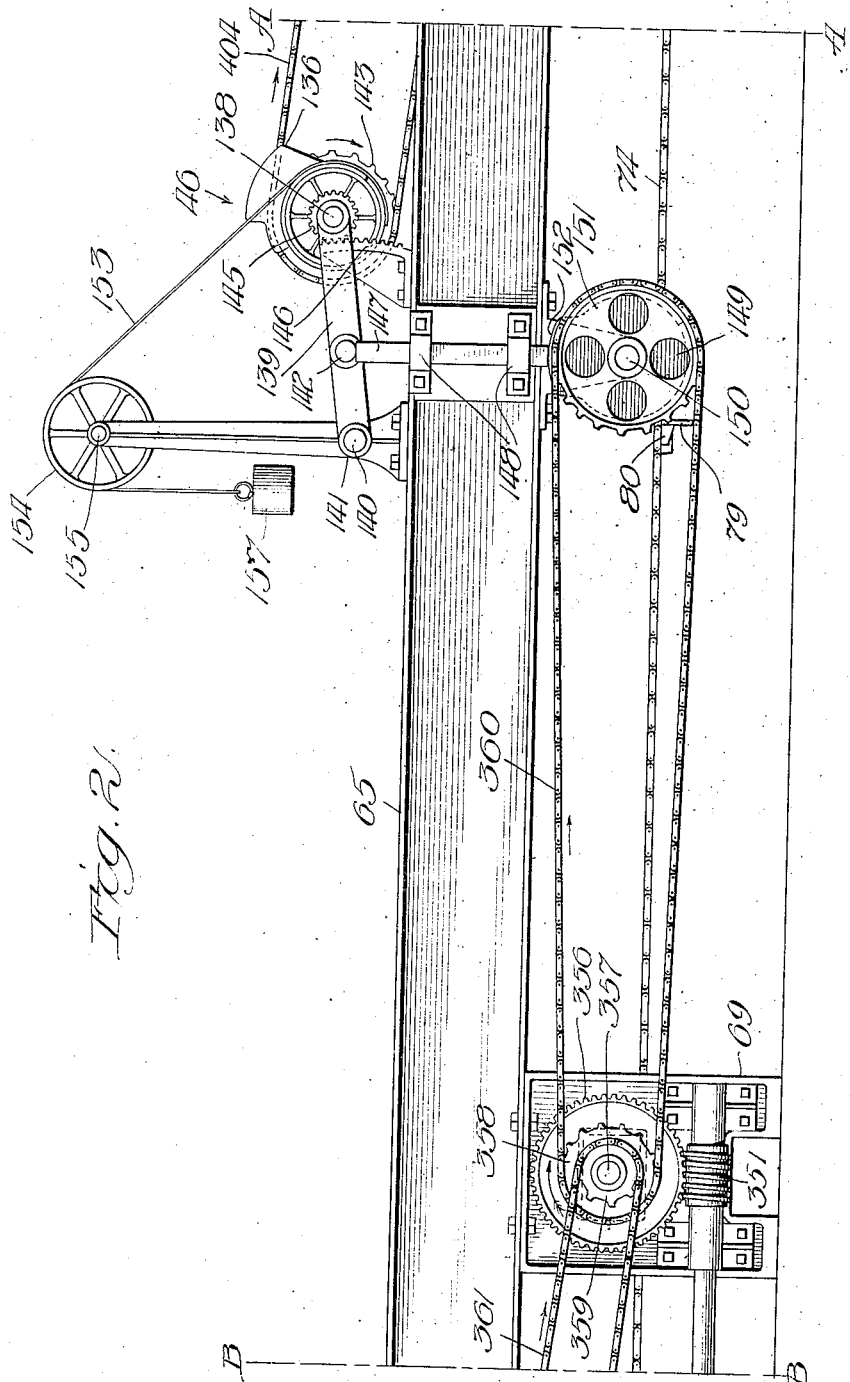

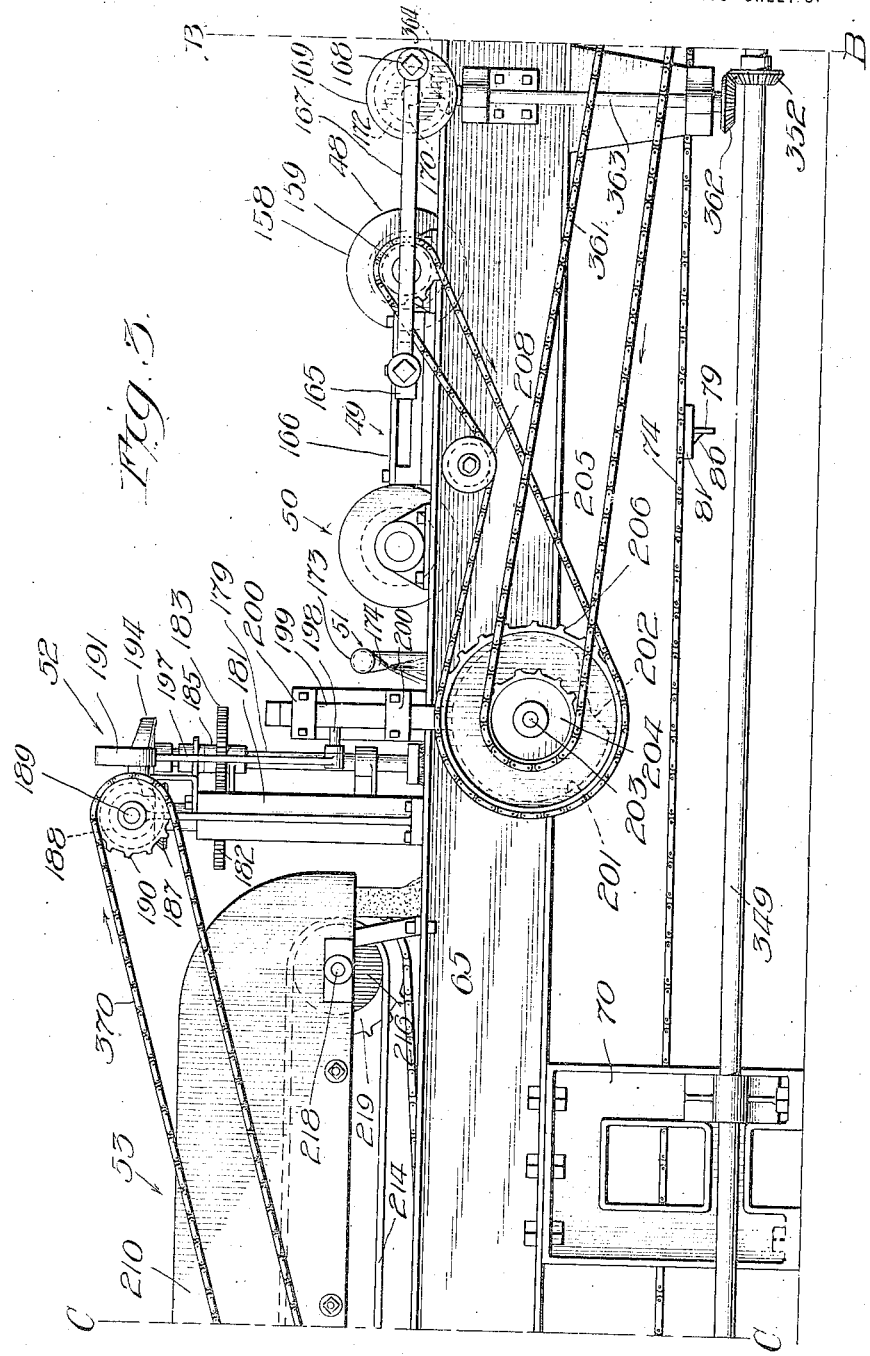

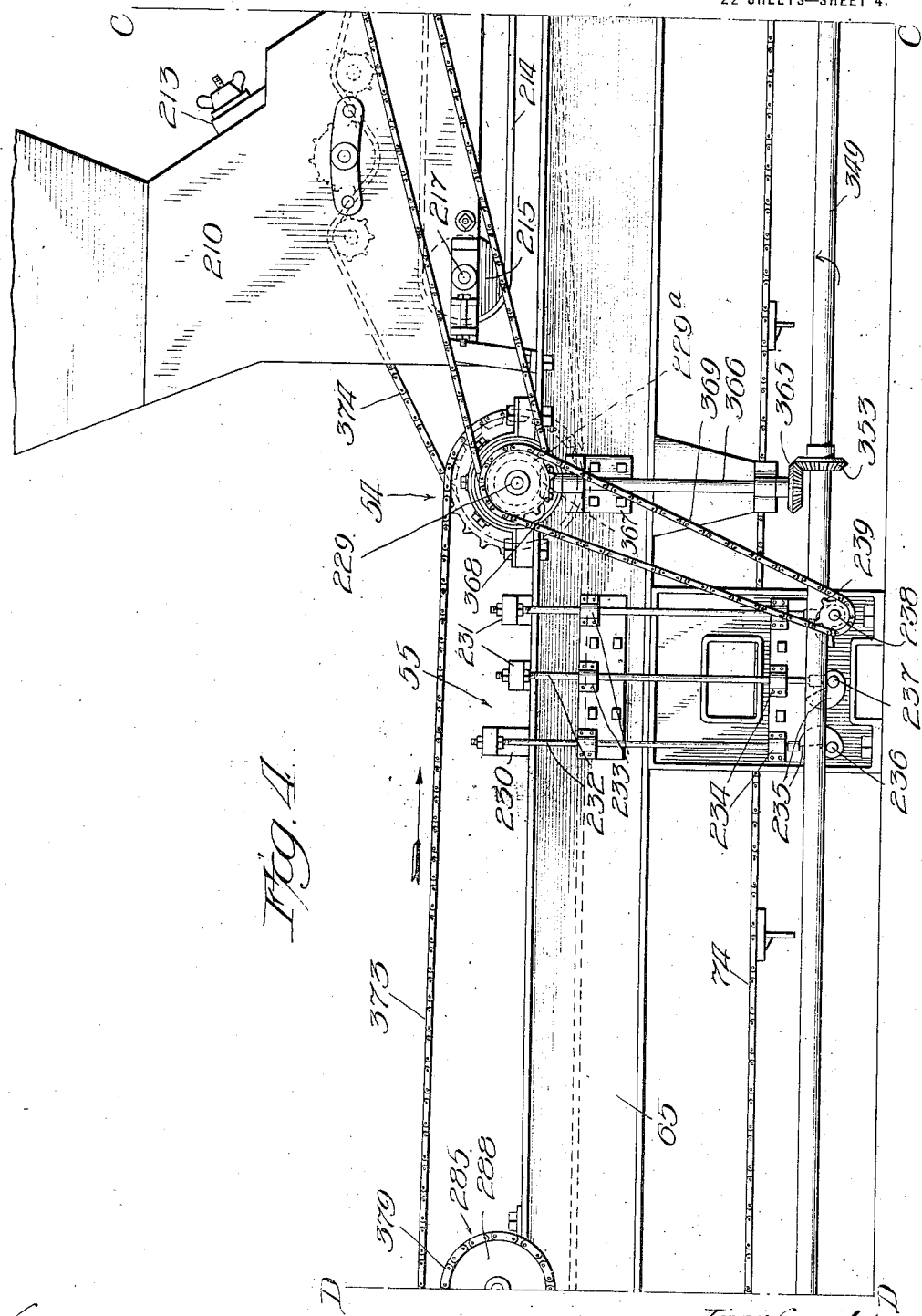

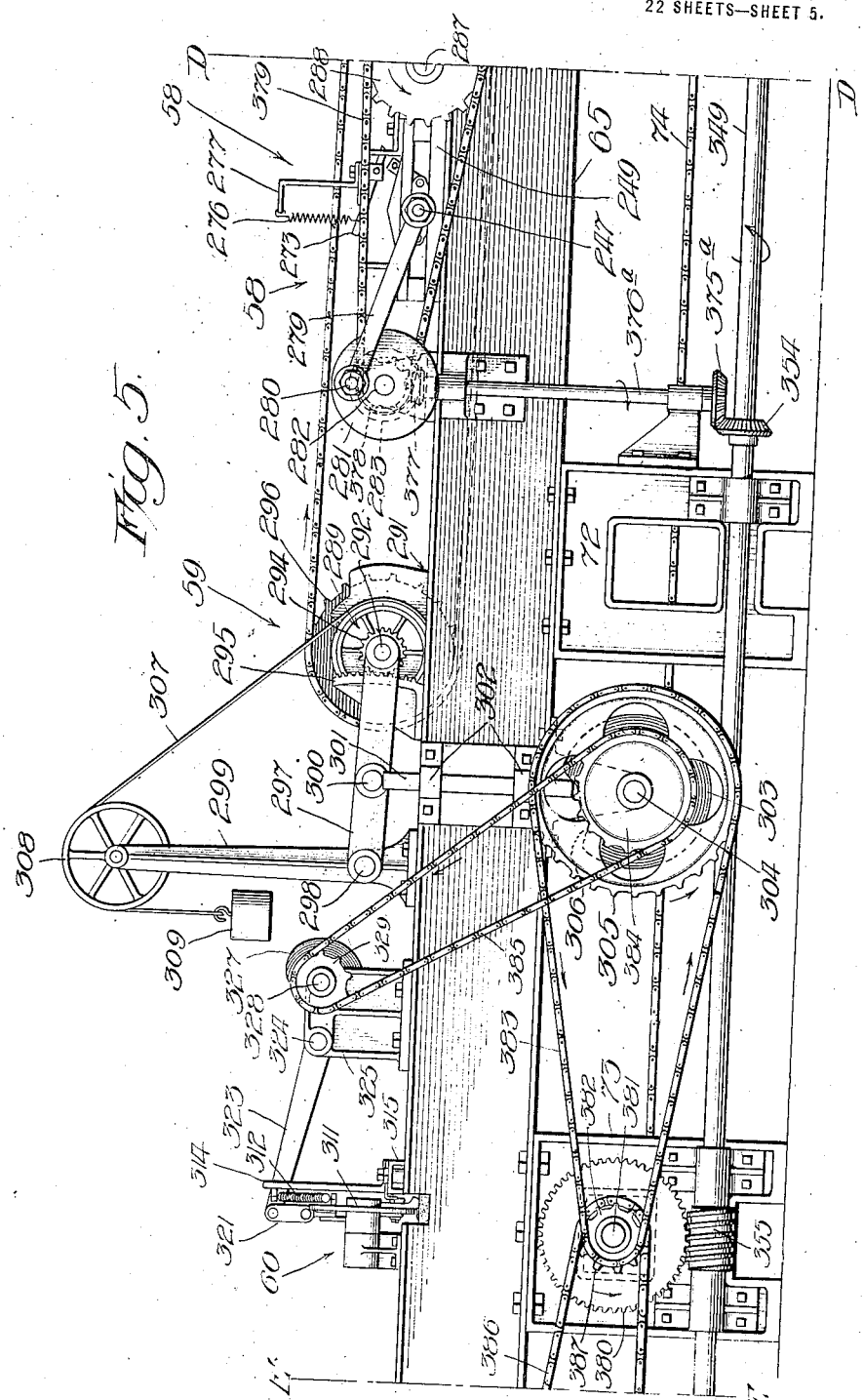

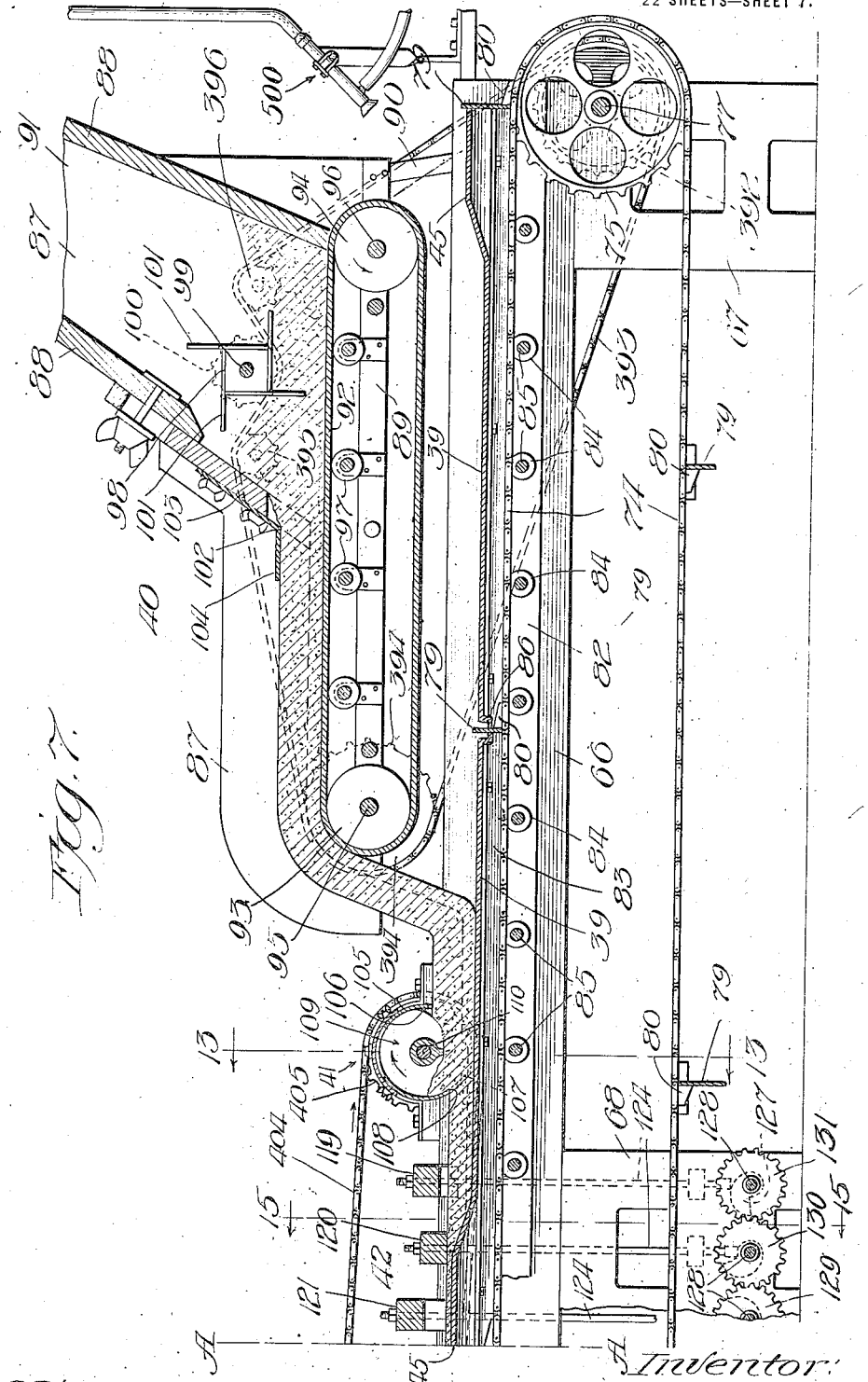

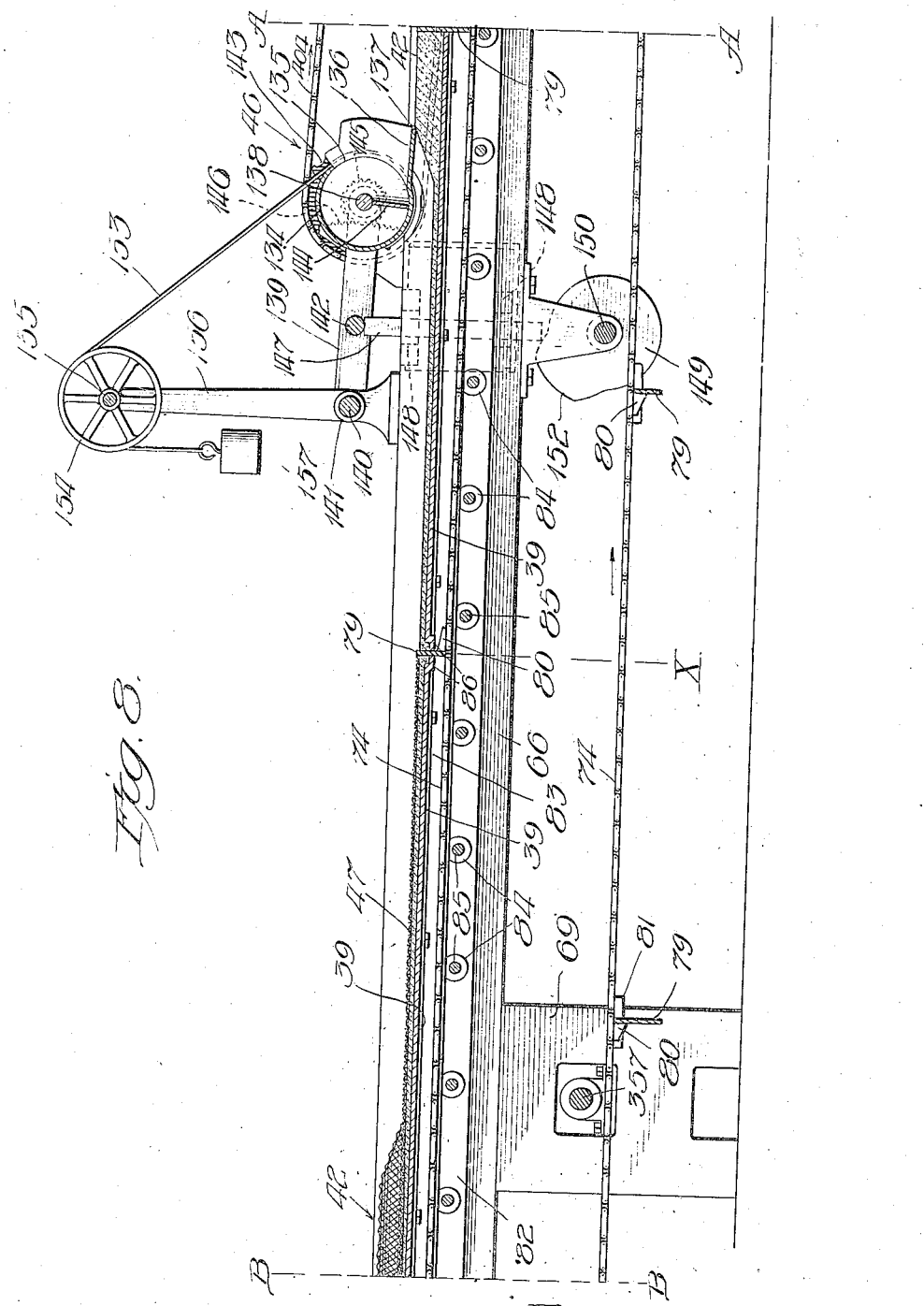

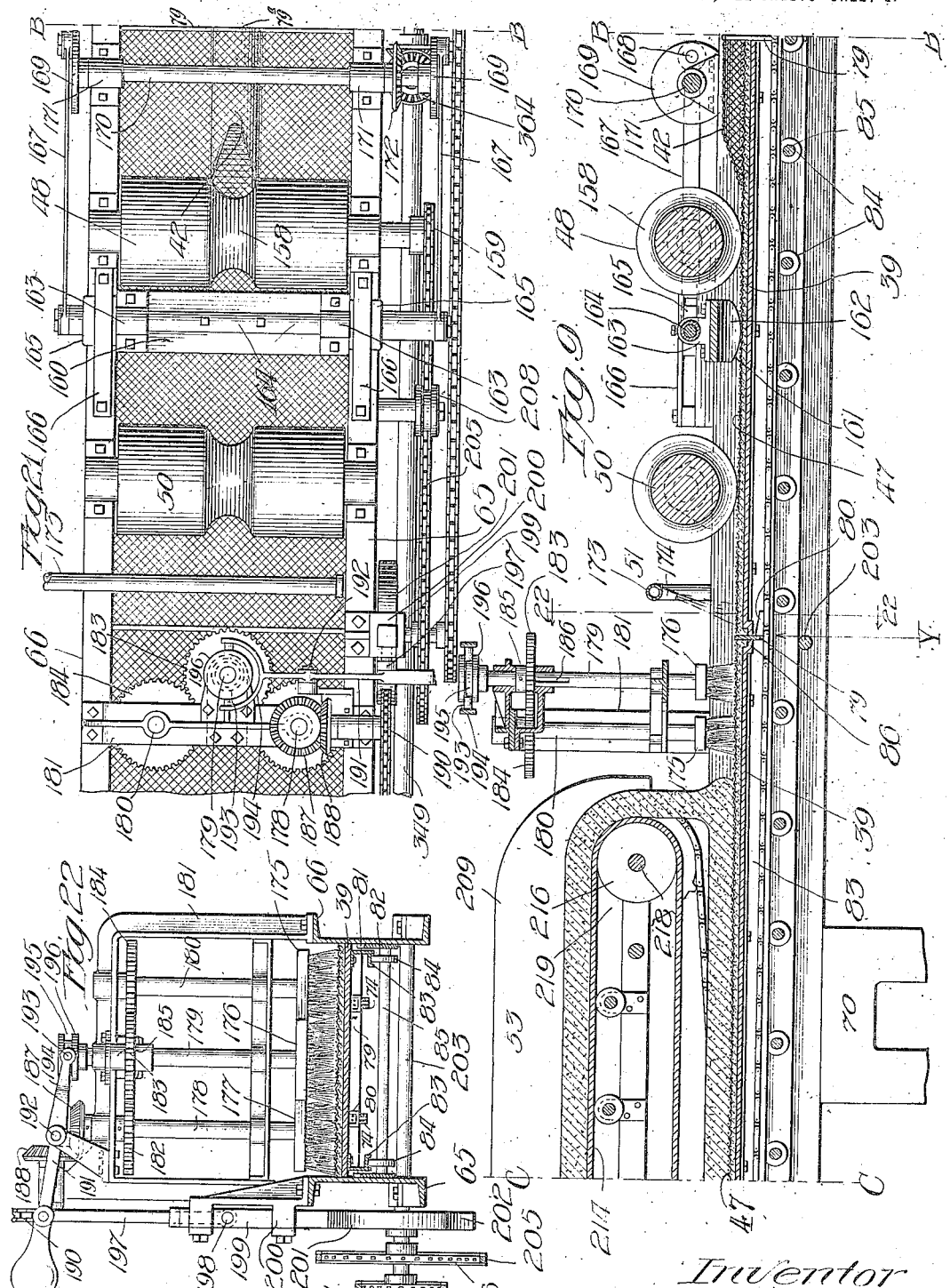

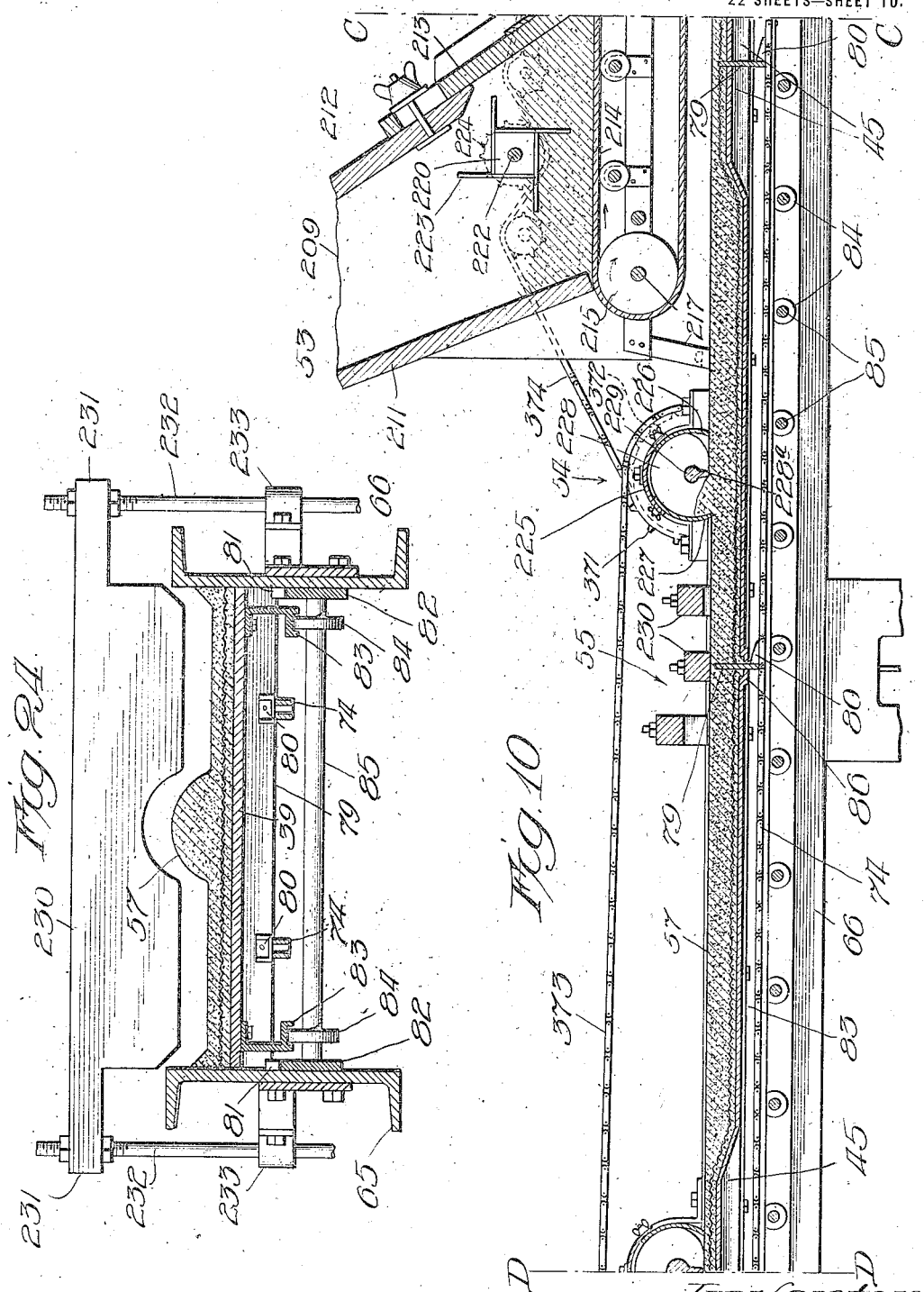

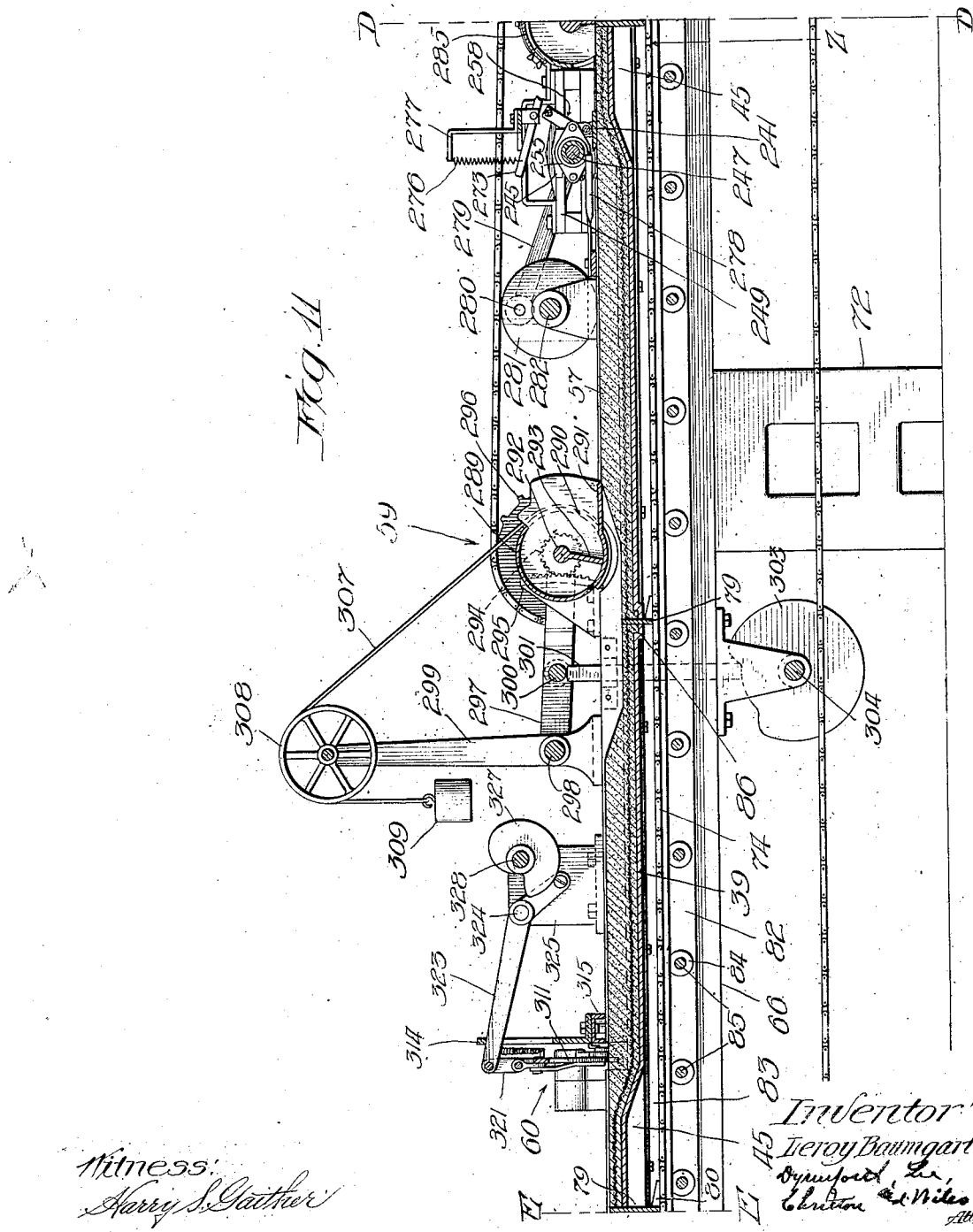

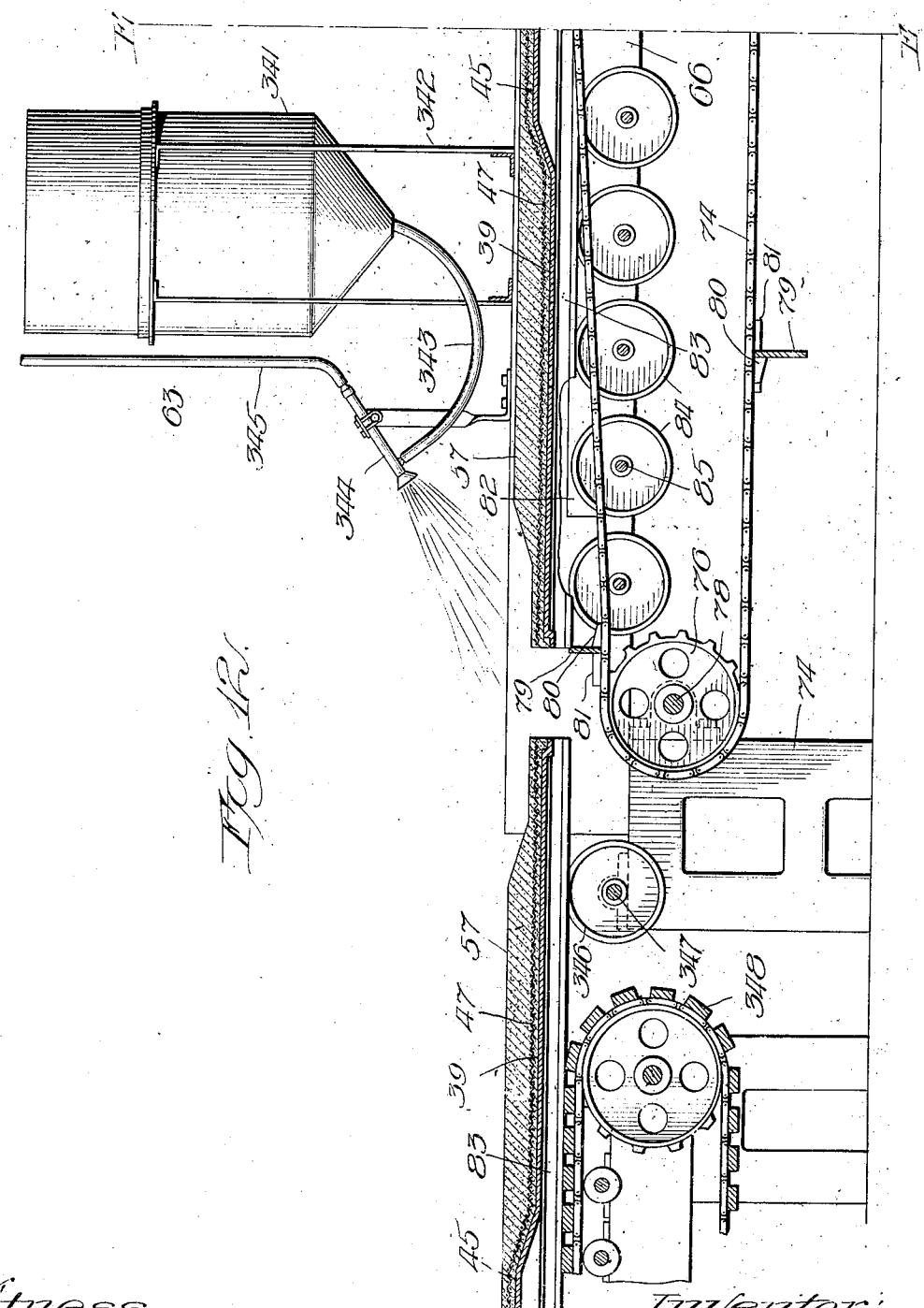

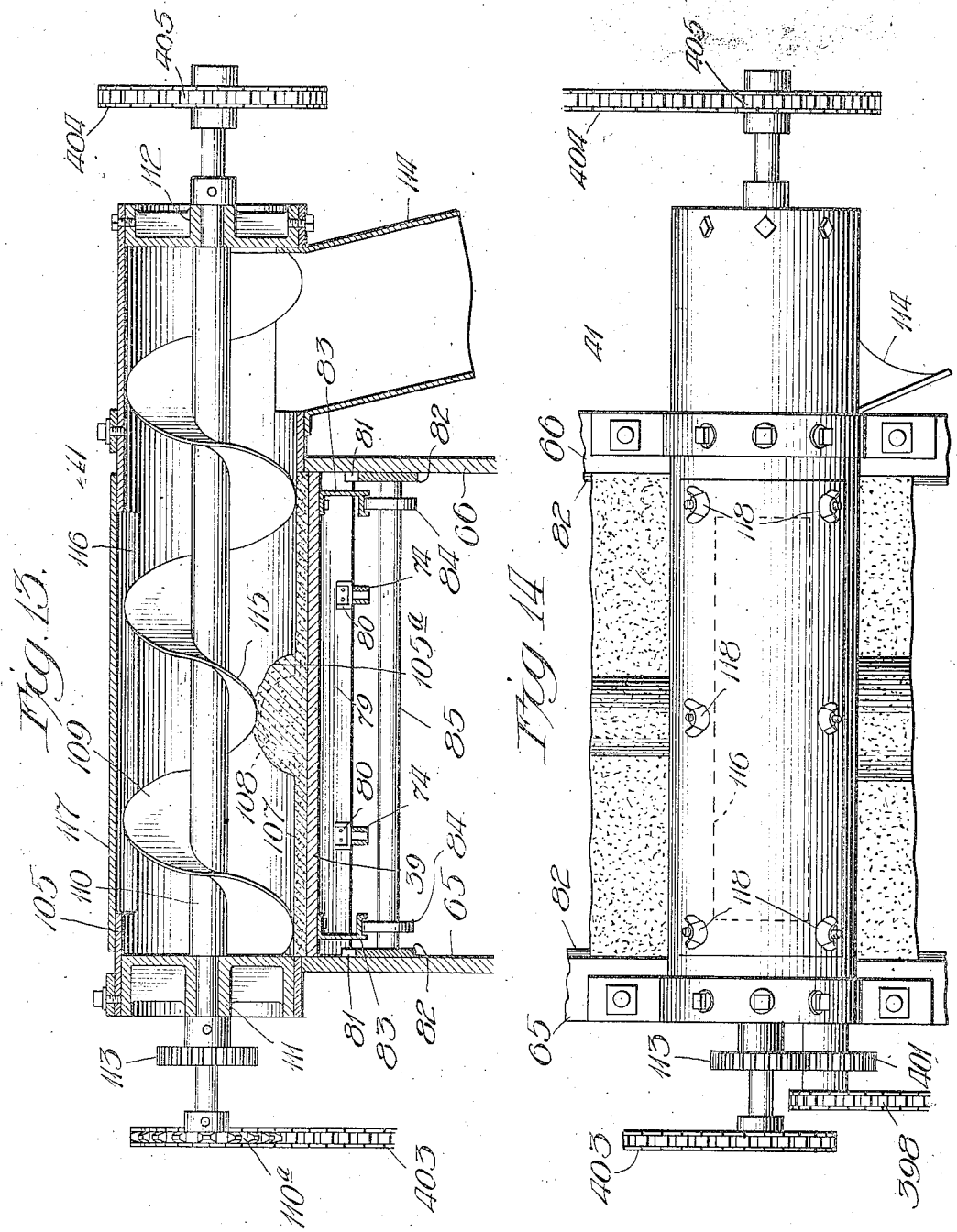

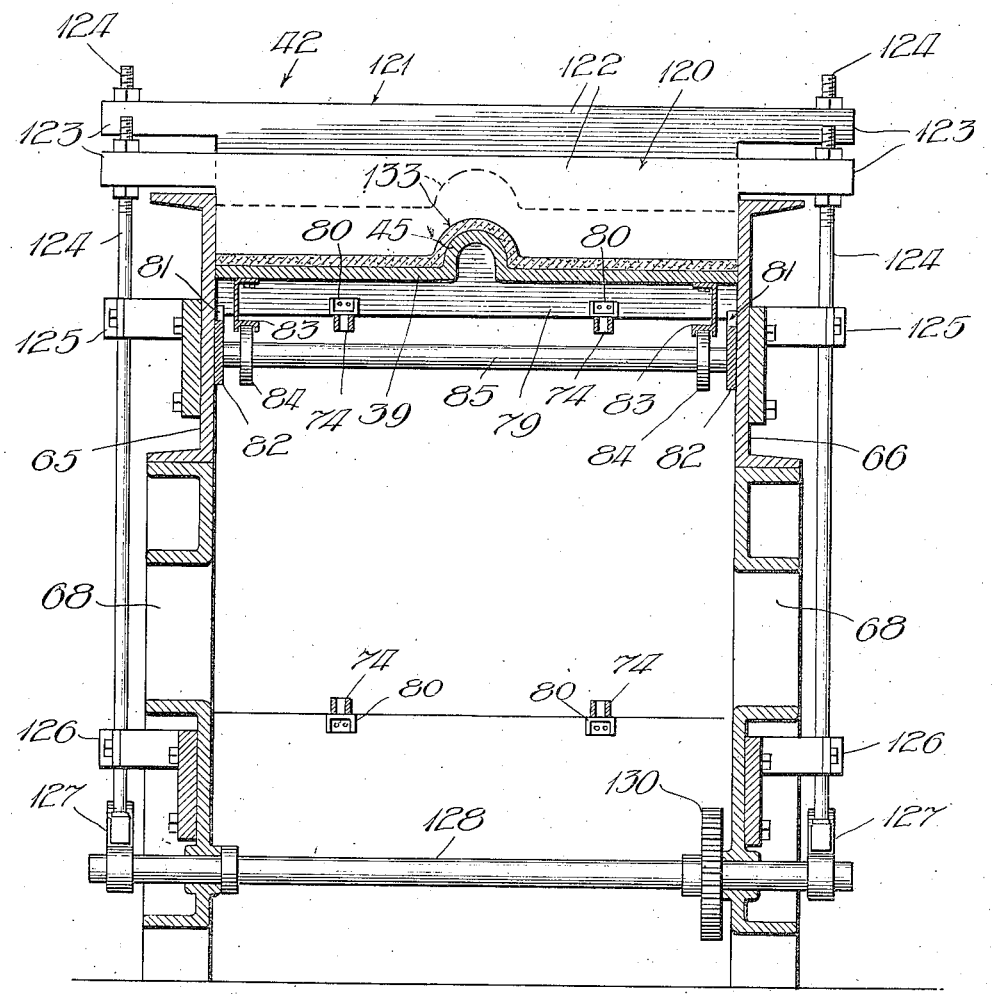

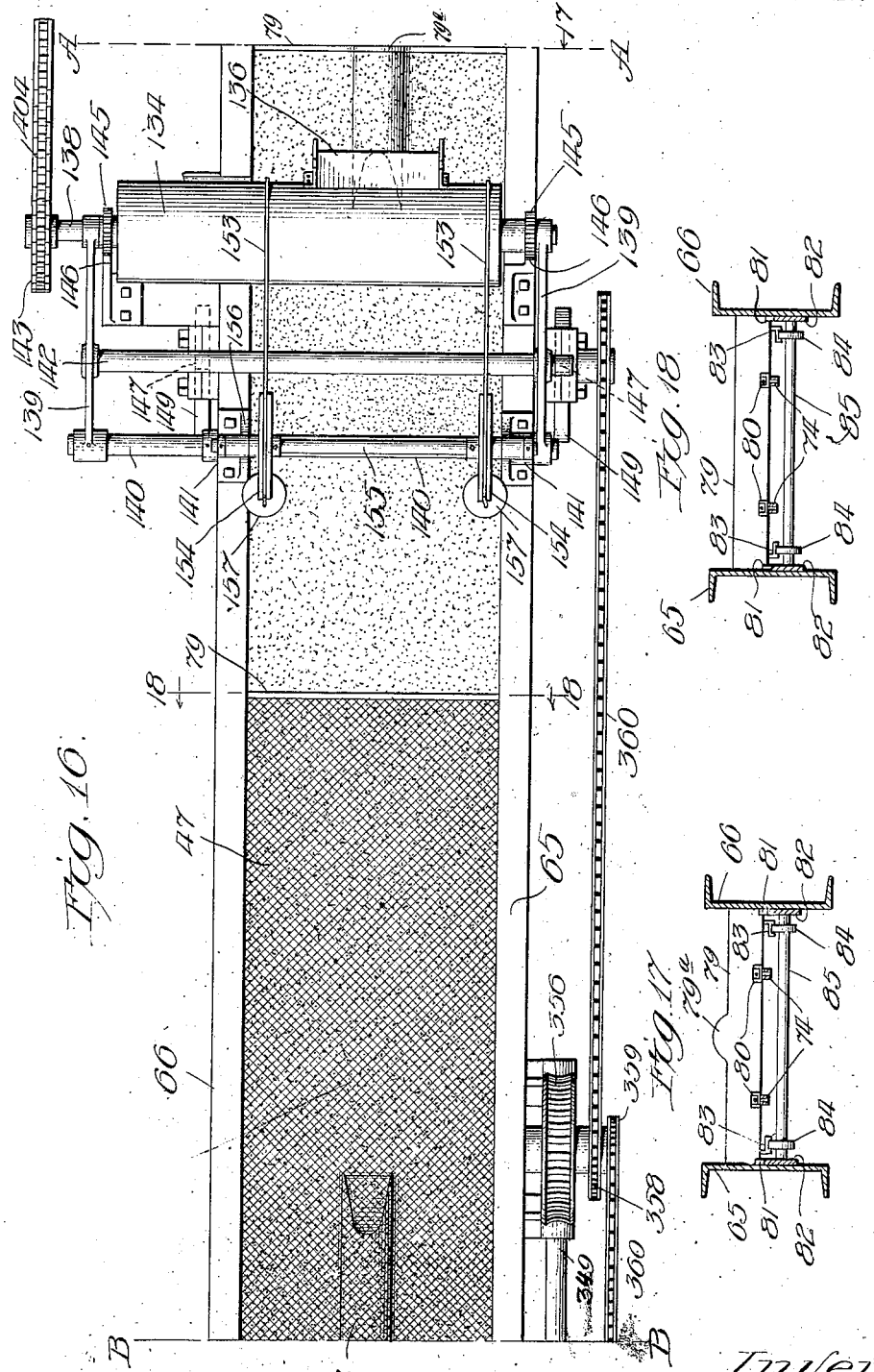

L. BAUMGARTL.
ART OF MANUFACTURING SLABS OR THE LIKE OF CEMENT OR LIKE MATERIAL.
APPLICATION FILED DEC. 30, 1918.
1,353,512. Patented Sept. 21, 1920.
22 SHEETS—SHEET 16.
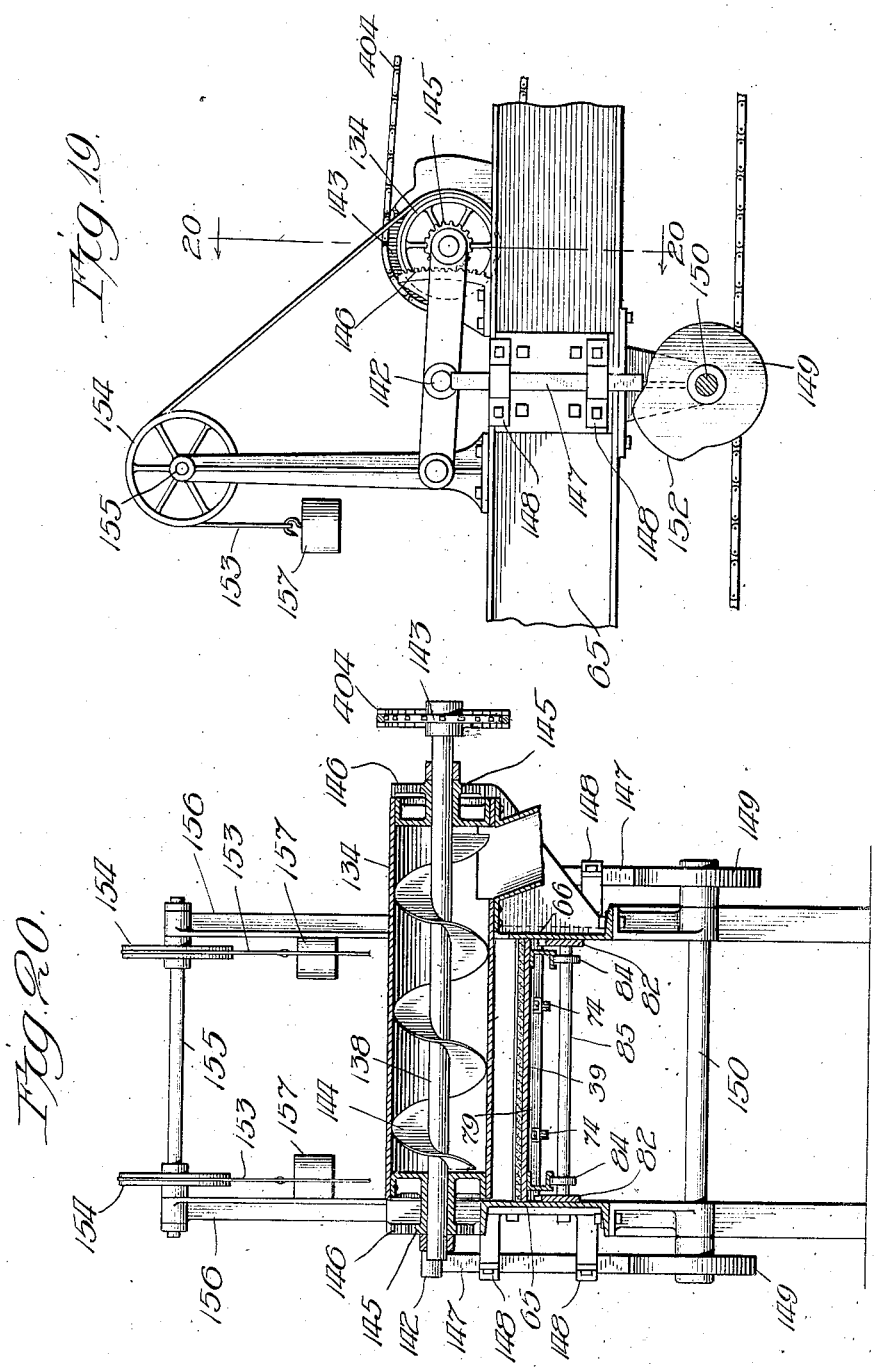

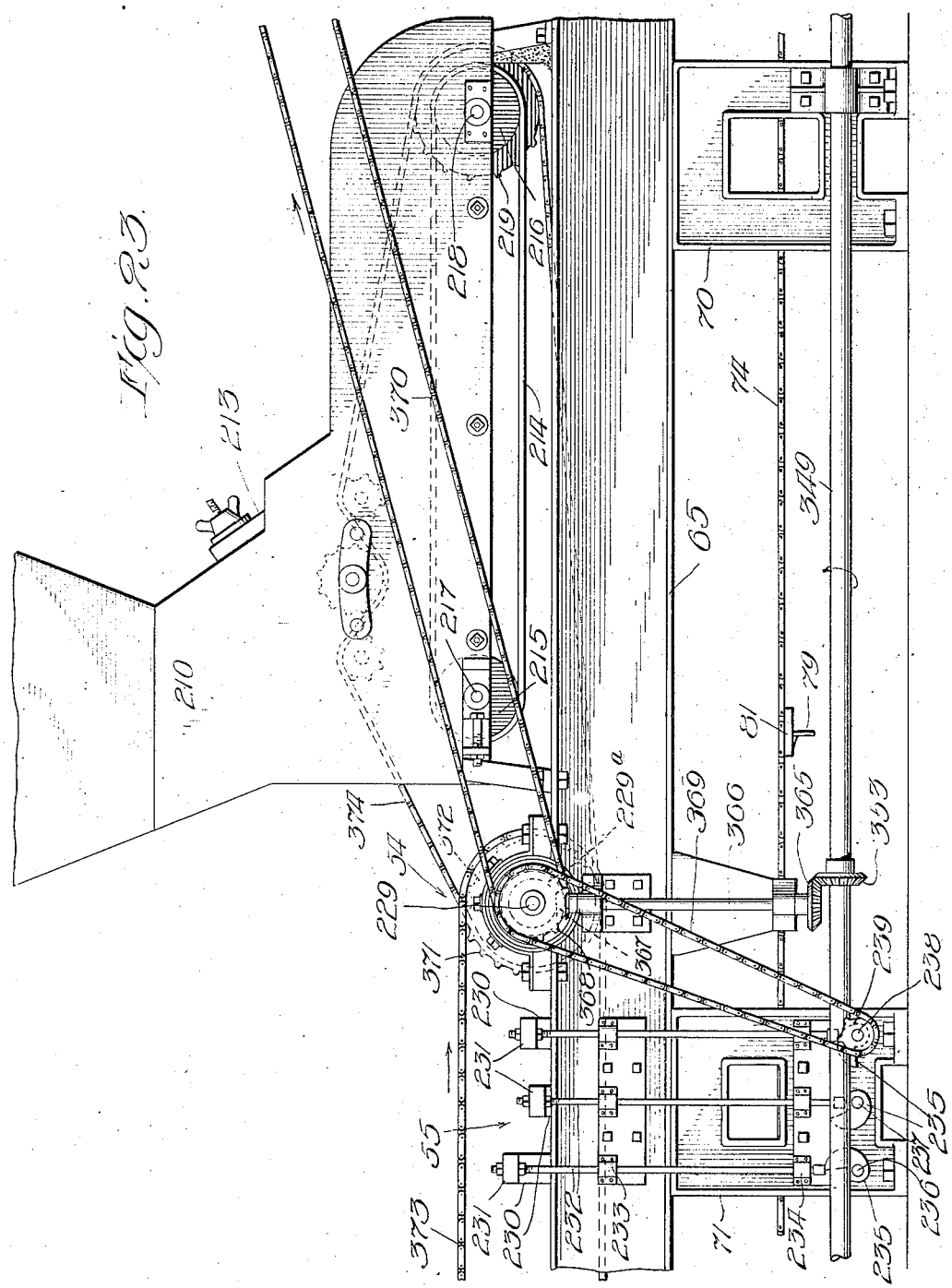

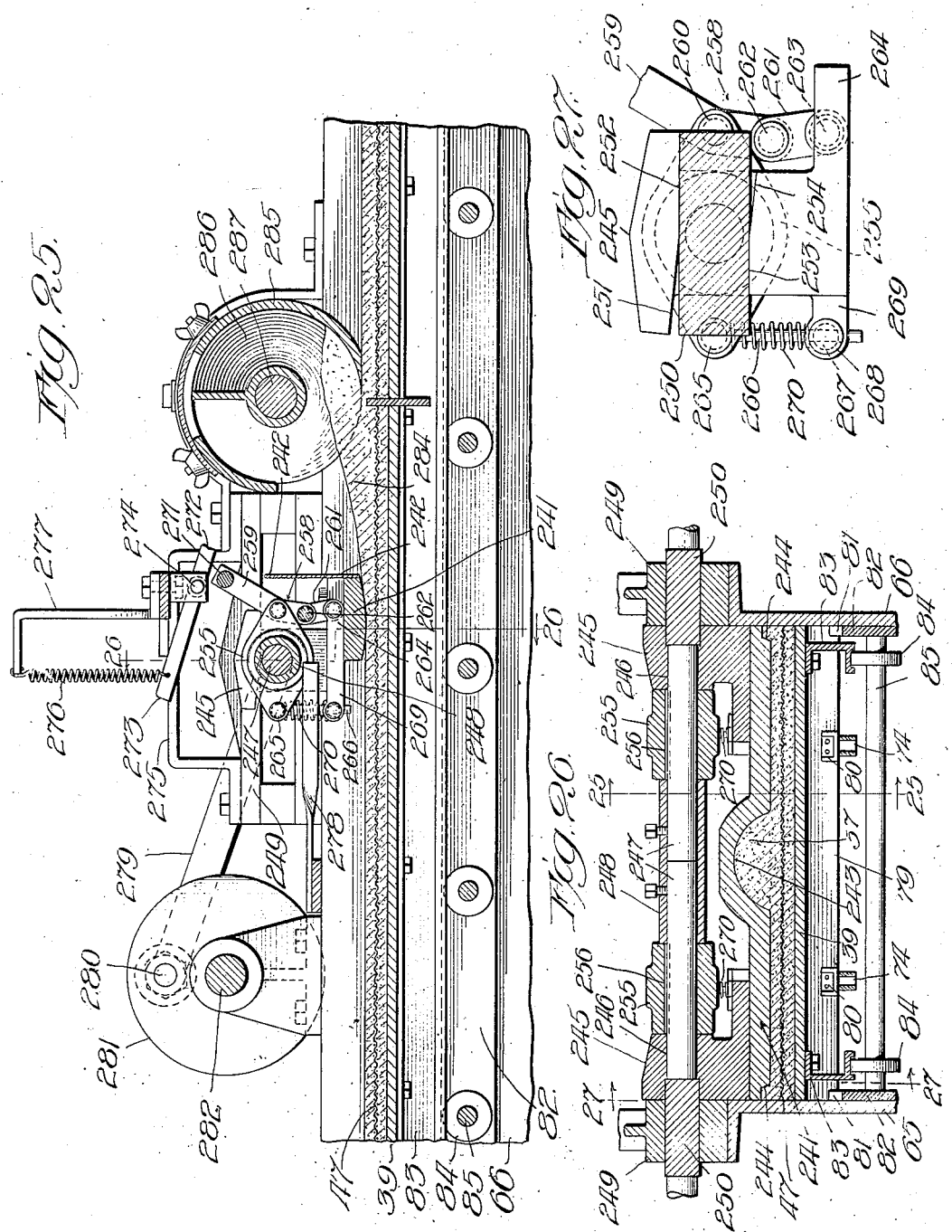

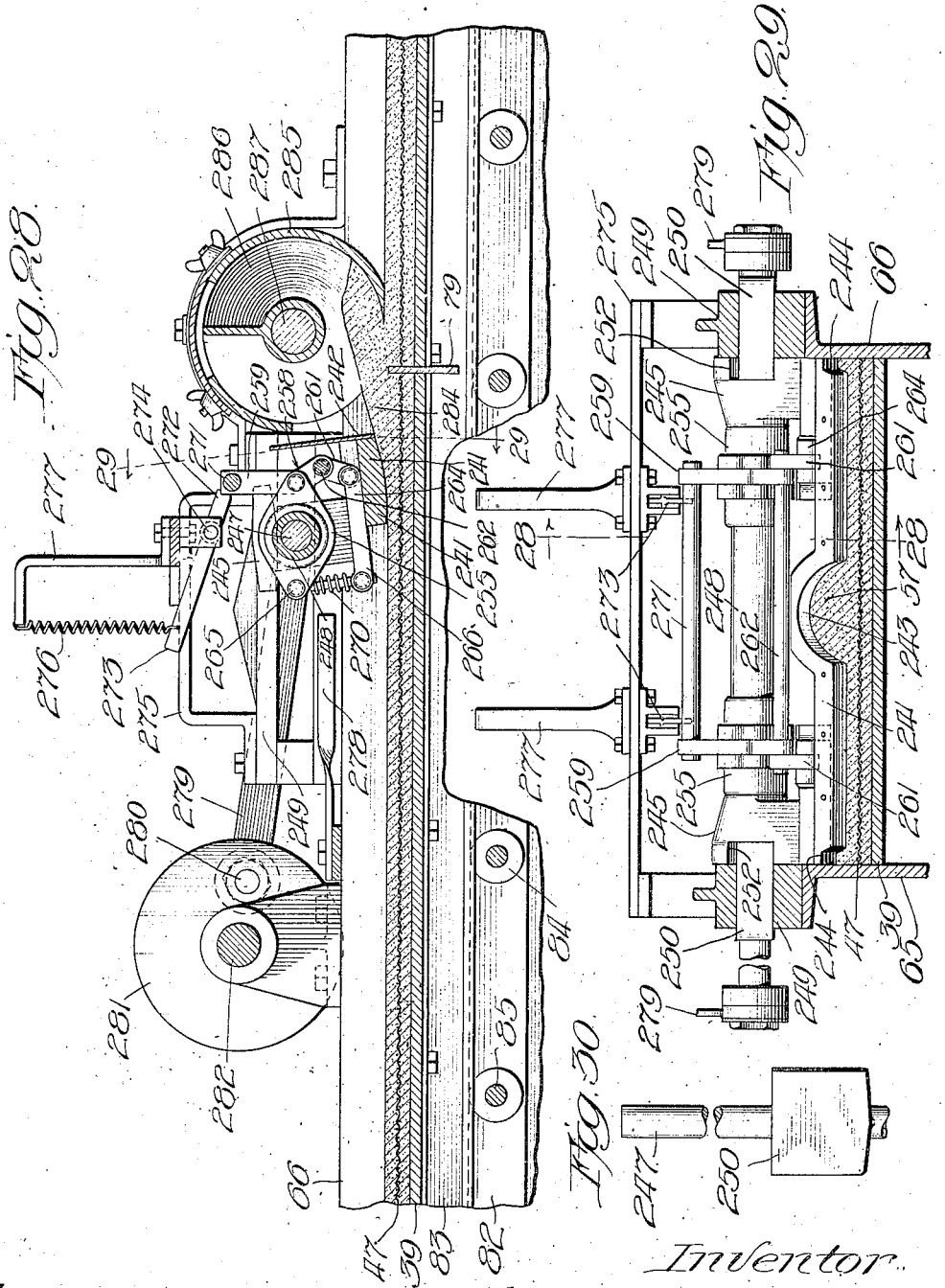

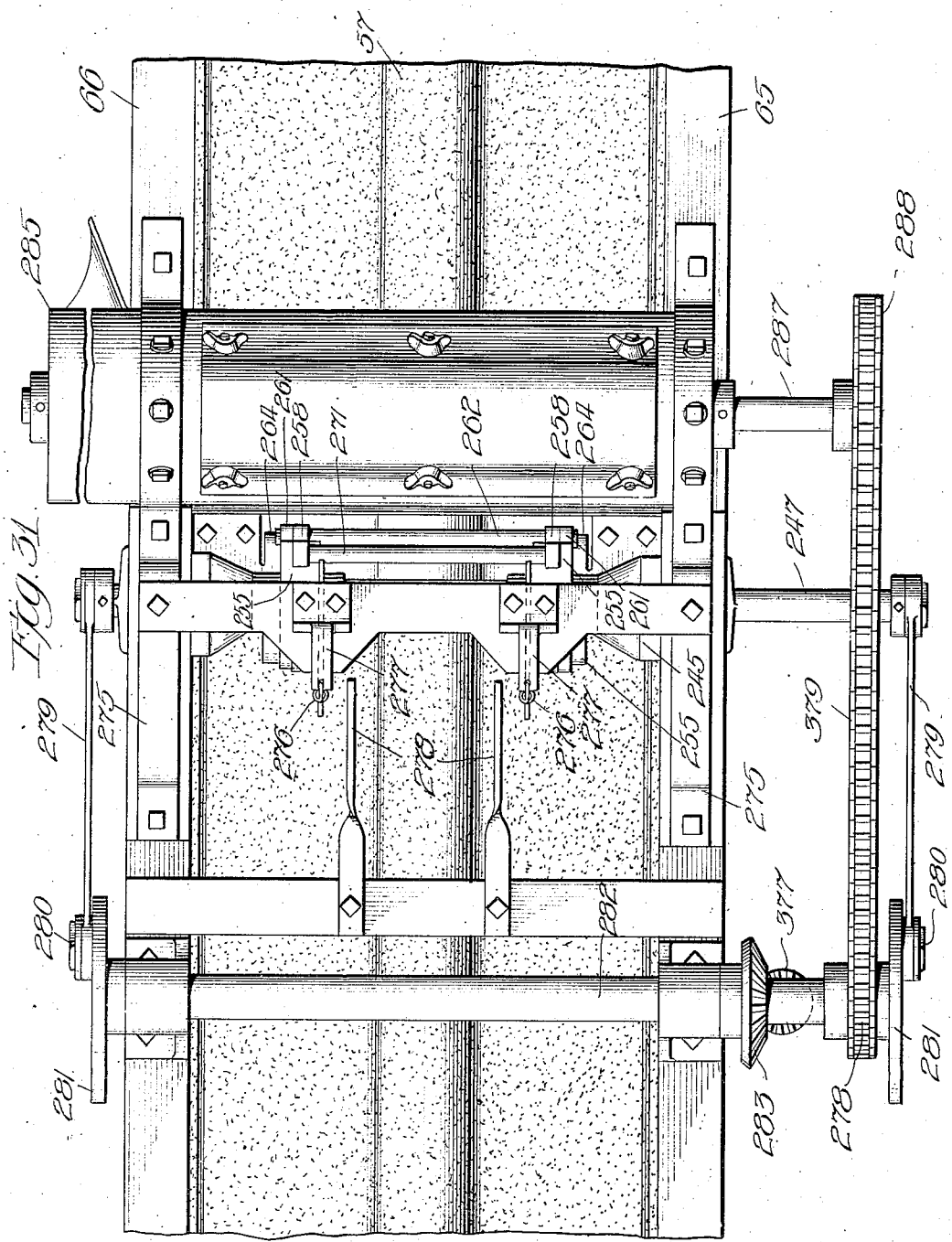

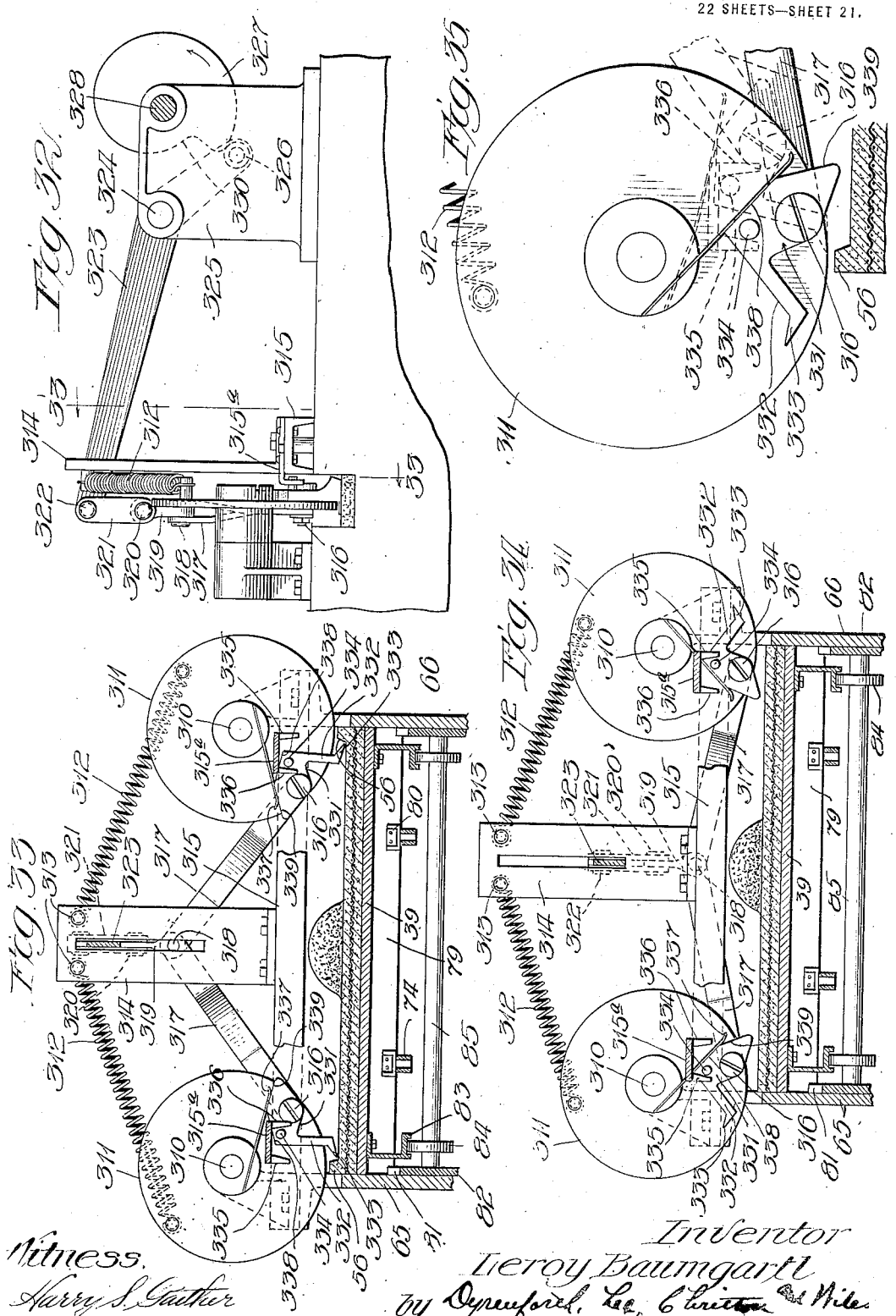

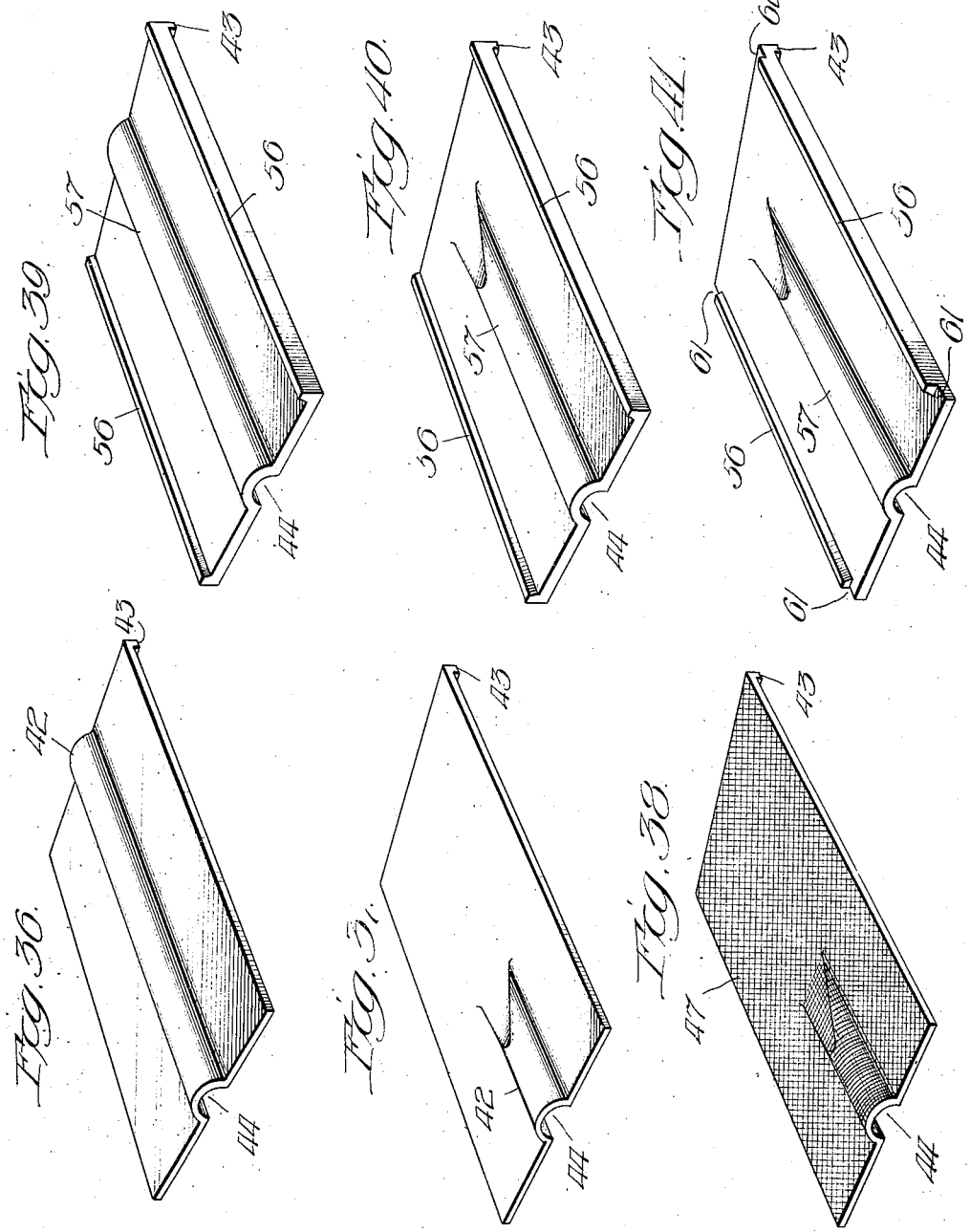

UNITED STATES PATENT OFFICE.

LEROY BAUMGARTL, OF CHICAGO, ILLINOIS.

ART OF MANUFACTURING SLABS OR THE LIKE OF CEMENT OR LIKE MATERIAL.

1,353,512.

Specification of Letters Patent.   Patented Sept. 21, 1920.

Application filed December 30, 1918.   Serial No. 268,851.

*To all whom it may concern:*

Be it known that I, LEROY BAUMGARTL, a citizen of the United States, residing at Chicago, in the county of Cook and State of Illinois, have invented a new and useful Improvement in the Art of Manufacturing Slabs or the like of Cement or like Material, of which the following is a specification.

My invention relates, more particularly, to the manufacture of slabs or tile, used in building roofs or other structures, and especially to tile of the reinforced type, though as will be clearly understood, certain features of my invention are not limited to use in the manufacture of these particular structures, or the manufacture of this particular type of tile or slab.

My primary object is to provide improvements in this art to the end that slabs, or tile, possessing the desired denseness and finish, may be produced, by mechanical means, and that the operation of forming such structures of cement, or the like, may be rapidly, mechanically and satisfactorily performed; the machine for doing this work being economical of manufacture, positive in operation and requiring the minimum amount of labor in the operation of producing the slabs, or tile; and other objects, as will be manifest from the following description.

Referring to the accompanying drawings, in which I have shown my invention in connection with the manufacture of slabs formed at opposite edges along the face with flanges, and intermediate these flanges, with a roll-portion extending lengthwise of the slab, Figure 1 is a view in side elevation of the front end portion of a machine for forming a slab of the type just referred to, this view representing the machine from the extreme front end to the line "A—A" on Fig. 1. Fig. 2 is a similar view of the machine from the line "A—A" to the line "B—B"; Fig. 3 is a similar view of the machine from the line "B—B" to the line "C—C." Fig. 4 is a similar view of the machine from the line "C—C" to "D—D." Fig. 5 is a similar view of the machine from the line "D—D" to the line "E—E," and Fig. 6, a similar view of the machine from the line "E—E" to the rear end of the machine, these six views taken together, constituting a view in side elevation of the entire machine. Figs. 7, 8, 9, 10, 11 and 12 are views in central longitudinal section of the portions of the machine shown in Figs. 1 to 6, inclusive, respectively. Fig. 13 is an enlarged section, taken at the line 13—13 on Fig. 7 and viewed in the direction of the arrows, showing the mechanism for removing the surplus slab-forming material, after it is delivered to the pallets upon which the slabs are formed and supported. Fig. 14 is a broken plan view of the mechanism of Fig. 13. Fig. 15 is an enlarged section, taken at the line 15 on Fig. 7 and viewed in the direction of the arrow, this section being taken adjacent the tamping mechanism. Fig. 16 is a plan view of the mechanism illustrated in Figs. 2 and 8. Fig. 17 is a section taken at the line 17 ("A—A") on Fig. 16 and viewed in the direction of the arrow. Fig. 18 is a section taken at the line 18—18 on Fig. 16, and viewed in the direction of the arrows. Fig. 19 is a view in side elevation of mechanism for cutting off part of the roll on the face of the slab, following the application of the first layer of cement to the pallets, this mechanism being shown in an intermediate position. Fig. 20 is a section taken at the line 20—20 on Fig. 19 and viewed in the direction of the arrows. Fig. 21 is a plan view of a portion of the mechanism shown in Fig. 9. Fig. 22 is a section taken at the line 22—22 on Fig. 9 and viewed in the direction of the arrows. Fig. 23 is a view in side elevation of that part of the machine at which the second layer is applied, the surplus cement removed and the material on the pallets tamped. Fig. 24 is a sectional view of the machine taken adjacent the tamping mechanism shown in Fig. 23, this section being taken at the line 24—24 on Fig. 10 and viewed in the direction of the arrows. Fig. 25 is a section of the machine taken through kneading mechanism and the surplus material removing device, the section being taken at the line 25 on Fig. 26, and viewed in the direction of the arrows. Fig. 26 is a section taken at the irregular line 26—26 on Fig. 25 and viewed in the direction of the arrows. Fig. 27 is a section taken at the line 27—27 on Fig. 26, and viewed in the direction of the arrows. Fig. 28 is a view like Fig. 25, the mechanism therein shown illustrating the kneader at the limit of its return stroke, and this section being taken at the line 28—28 on Fig. 29 and viewed in the direction of the arrows. Fig. 29 is a section taken at the line 29 on Fig. 28, and viewed in the direction of the arrows. Fig. 30 is a broken plan view of a portion of the kneader mechanism. Fig. 31 is a plan view of the kneading mechanism and the means for removing surplus material. Fig. 32 is an enlarged view in side elevation of the mechanism for cutting away the ends of the flanges on the upper surface of the slab. Fig. 33 is a section taken at the irregular line 33—33 on Fig. 32 and viewed in the direction of the arrows, the mechanism illustrated being shown in the position it occupies previous to its operation for cutting off the ends of the flanges. Fig. 34 is a view like Fig. 33, showing the position occupied by the mechanism after the ends of the flanges have been removed. Fig. 35 is an enlarged view in elevation of a portion of the cutting mechanism at the left-hand side of Fig. 34, illustrating by full lines and dotted lines the manner in which this cutter operates. Fig. 36 is a perspective view showing the form into which the first layer of cement is molded, in an early stage of the process forming the slab. Fig. 37 is a similar view, showing the slab of 36, after it has been operated on by the cutting mechanism to remove a portion of the roll. Fig. 38 is a similar view showing reinforcement for the slab applied to the upper surface of the slab of Fig. 37. Fig. 39 is a similar view, showing the condition of the slab after the second layer of cement has been applied to the structure of Fig. 38, and has been operated on by the tamping and kneading mechanism. Fig. 40 is a similar view, showing the condition of the slab, after the second cutter has operated on its roll, to remove a portion thereof; and Fig. 41, a similar view showing the slab in finished form.

As a preface to the following description of the illustrated machine, it may be stated that the machine provides means for feeding pallets 39 therethrough in succession for receiving the cement, or the like material, for forming the slabs, the pallets being first oiled, as by the means shown at 500, to prevent the cement material from adhering thereto and then moved under means which operate to discharge upon the pallets a layer of the cement, these means being generally illustrated at 40 (Fig. 1) and the pallets then passing under a mechanism, represented generally at 41 (Fig. 1), for removing a portion of the layer to cause it to be of the desired thickness for presenting to the tamping mechanism represented at 42 (Fig. 1) by which the cement is tamped on the pallets. In this operation, each slab is caused to present on its upper surface a roll represented at 42, in Fig. 36, and at one end thereof a depending flange 43 with a grooved portion 44 at the opposite end of the slab at its under side concentric with the roll 42, the hollow portion 44 being produced by the molding of the cement against the pallet which is provided at one end with a roll, as represented at 45 in Figs. 11 and 15. The pallets then pass under cutting mechanism represented at 46 (Fig. 2), which cuts off the greater portion of the rolls 42 as represented in Fig. 37. After the pallets have passed the cutting mechanism 46 they are brought to a position where the operator applies to the upper surface of the slab in the form shown in Fig. 37, reinforcing material of any desired character, such as that represented at 47, which conformingly fits the upper contour of the slab formation of Fig. 37. The pallets are then passed under a device represented at 48 (Fig. 3) for pressing the reinforcement 47 into the slabs thus formed and then pass under a kneading mechanism 49 (Fig. 3), which kneads the portion of the cement exposed above the reinforcement 47 to thoroughly embed the reinforcement in the cement of the slab, the reinforcing sections 47 passing under a device represented at 50 (Fig. 3) for preventing dislodgment of the reinforcement. The pallets then move under a water-spraying device 51 (Fig. 3) which sprays water upon the upper surface of the slabs so formed, to "soup" the cement, and then under mechanism represented generally at 52 (Fig. 3) for roughening the upper surface of the slab so formed and coating the reinforcement with the soup-cement to provide desirable bond for the next layer of cement to be applied and which is generally applied through the medium of the mechanism represented at 53 (Fig. 3). After receiving the second layer of cement, the pallets pass under a surplus-removing mechanism represented at 54 (Fig. 4) and thence under tamping mechanism represented at 55 (Fig. 4), the slab after passing from this tamping mechanism being substantially in the form shown in Fig. 39, wherein it has flanges 56 formed on its upper surface, at its opposite sides, and presents a roll 57 on its upper surface extending lengthwise thereof midway between the flanges 56 and concentric with the hollow portion 44 on its under side, this roll 57 being built up from the roll 42 of Fig. 37. The pallets are then moved into a position where the cement mass thereon of Fig. 39 is subjected to the action of kneading mechanism 58 (Fig. 5) and from this mechanism passes to roll-cutting mechanism 59 (Fig. 5), which cuts away a portion of the roll 57 as indicated in Fig. 40. The pallets then carry the slabs so formed into a position wherein they are acted upon by the flange-cutting mechanism 60 (Fig. 5), which operates to cut away the opposite ends of the flanges as indicated at 61 and 62 in Fig. 41. The pallets are then fed under a spraying mechanism 63 (Fig. 6) for spraying upon the slabs any suitable coloring fluid to cause the slabs to present the desired color. After passing beyond the mechanism 63, the pallets discharge upon a conveyer mechanism generally represented at 64, which conducts these pallets, with the finished slabs thereon, to any suitable point of discharge, it being understood that the slabs remain on the pallets until they have set sufficiently to retain their shape when removed from the pallets.

The frame of the machine is formed of spaced structural beams 65 and 66, which extend lengthwise of the machine and in parallel relation, these beams being supported upon a series of standards 67 to 73, inclusive.

The pallet-feeding mechanism, which operates to feed the pallets into operative position relative to the various mechanisms described, comprises a pair of chains 74, 74 supported to extend within the planes of the frame-sides 65 and 66, on sprockets 75 and 76 mounted on shafts 77 and 78, journaled in the frame. The chains 74 are arranged in parallel relation and at intervals are provided with plates 79 disposed transversely thereof and connected with the chains, as indicated at 80, and so arranged that in the movement of the chains through their upper course these plates will project upwardly, as shown in Fig. 7. The plates 79 which are spaced a distance apart equal to the length of the pallets and of the slabs to be formed, are substantially the same width as the space between the frame members 65 and 66, as clearly indicated in the drawings, the inner surfaces of the frame members 65 and 66 and the plates 79 forming the sides of the molds for the slabs, the bottoms of which are the pallets 39. The division-plates 79 are provided at their under sides with shoes 81 at which they rest and slide upon the upper surfaces of tracks 82 secured to the inner faces of the frame-members 65 and 66. These track members are of such a form as illustrated as to cause the division plates 79 in their movement with the chains 74 to the left in Figs. 1 to 6, inclusive, to move upwardly relative to the pallets, which latter are supported at shoes 83 upon the rollers 84 provided on shafts 85 secured in the frame of the machine. The shape of these tracks is such that in the movement of the division plates from the right-hand end of the machine in Fig. 1 to the line X in Fig. 8, these division plates will move to a position wherein they extend slightly above the upper level of the finished first layer of cement applied to the pallets, and from the point marked Y (Fig. 9) to the point marked Z (Fig. 11) will rise to cause their upper surfaces to extend substantially flush with the upper surfaces of the slabs after the second layer has been applied to the first layer, these tracks being so formed at the left-hand end of Fig. 6, that the division plates are caused to lower out of engagement with the cement on the slabs in the movement of these plates after passing the flange-cutting mechanism 60. It may be here stated that alternate ones of the division plates 79 are formed intermediate their ends on their upper surfaces with projections 79ᵃ of the same general shape and size as the cross-sectional shape of the finished roll 57.

The pallets 39, in the operation of the machine, are introduced, in succession, into the space between the frame-members 65 and 66, at the right-hand side of Fig. 1, to rest at their shoes upon the rollers 84, the pallets being pushed forwardly by hand until they are in a position to be engaged by the division-plates 79 on the conveyer, which by engaging with the rear ends of the pallets drive the latter to the left in Figs. 1 to 6, inclusive. In positioning the pallets in the machine, they are so arranged that the roll-equipped portion 45 of the one pallet opposes the roll-equipped portion 45 of the next pallet, as shown at the right-hand side of Fig. 10, and those ends of the pallets which are unprovided with rolls oppose each other, as represented at the central portion of Fig. 10, these last-referred-to portions of the pallets being chamfered transversely of the pallets along their upper edges, as represented at 86, to form the depending flanges 43 of the slabs (Figs. 36 to 41, inclusive).

Referring to the oiling means 500, these means may be of any desirable construction for coating the upper surfaces of the pallets with oil to prevent the cement from adhereing thereto, as shown, these means comprising a spraying device positioned above the conveyer 74 to spray oil to the pallets, and to which oil is supplied from any suitable source.

Referring to the cement-feeding mechanism represented at 40, this structure, as shown, is formed of side members 87 spaced apart and extending lengthwise of the machine and connected with transversely-disposed members 88, which, with the side members 87, form a hopper or conduit through which the cement, or other material from which the slabs are to be formed, is conducted in ribbon form to the pallets. The hopper construction thus provided is connected with bars 89 which are supported through the medium of legs 90 rigidly connected with the outwardly-turned flanges of the side-members 65 and 66 and is provided with means for carrying the cement, or other material with which it is charged, into position for discharge upon the pallets 39, as they are moved in succession through the machine through the medium of the endless conveyer as described.

This mechanism, as shown, comprises an endless-belt 92 supported on rollers 93 and 94 fixed on shafts 95 and 96, respectively, these shafts being journaled in the sides of the hopper and driven in the direction of the arrows in Fig. 7, as hereinafter described, the upper portion of the belt 92 running over rollers 97 journaled at their ends in bearings on the sides of the hopper. The hopper 87 contains, by preference, means for agitating the cement in the hopper and aiding in the discharge of the cement from this part of the apparatus for delivery to the pallets. The agitator in the form illustrated comprises a body-portion 98 of rectangular shape in cross-section, rigidly mounted on a shaft 99 journaled in the sides 87 of the hopper and equipped with a sprocket 100, driven as hereinafter described, and blades 101 secured to the body-portion 98, it being preferred that these blades be provided of the form, and arranged, as shown, namely to extend outwardly from the body-portion 98 in the planes of its sides, with those sets of blades which are disposed at right angles to each other arranged in staggered relation.

In the operation of the machine, the cement discharges from the hopper in ribbon form, and, in order that this ribbon be of substantially uniform thickness, a gage-device, represented at 102, is provided. This gage-device comprises a plate-section 103 which extends cross-wise of the hopper device and forms a continuation of the wall of the hopper at the outlet thereof, which it overlaps and on which it is adjustable up and down to adjust the rearwardly-extending plate-section 104 of this device, vertically with respect to the conveyer-belt 92, the height at which this part 104 extends gaging the thickness of the ribbon of cement discharged from the hopper. The lower edge of the gage-device 102 is provided midway between the frame-sides 65 and 66 with a cut-out portion, as represented in Fig. 7, which is of substantially the cross-sectional shape of the rolls to be formed on the tops of the slabs but of slightly larger dimensions whereby the ribbon of cement fed to the pallets 39 has a bead or roll on its upper surface midway between its sides, as shown in Fig. 7.

As hereinbefore stated, the ribbon of cement discharged from the feeding device 40 upon the pallets is fed by the action of the pallets to the surplus-removing mechanism 41 for causing this first-applied layer of cement to be of substantially uniform thickness, except at its roll, and of substantially uniform density, a description of these means being as follows, reference being had more particularly to Figs. 1, 7, 13 and 14:

Extending transversely of the machine and rigidly supported in depressed seats on the frame-members 65 and 66 of the machine, is a casing 105 of cylindrical form, the lower portion of this casing being cut away throughout the width of the space provided between the frame-members 65 and 66 as indicated at 106 and 107. The edge 106 extends above the level of the layer of cement applied to the pallets and the edge 107 extends below the upper edge of the layer and determines the amount of material removed from the layer by the mechanism 41, the edge 107 being parallel with the plane in which the pallets move except at the portion thereof which is at the longitudinal center of the machine, at which portion it is cut away, as indicated at 108, in the form of a half circle, this cut-away portion being concentric with, but of slightly larger dimensions than the roll-portion 42 of the layer in Fig. 36. The casing 105 contains a helicoid 109 which is rigidly secured to a shaft 110 extending through, and concentric with, the casing 105, and journaled at its opposite ends in bearings 111 and 112 carried by the casing 105 and driven as hereinafter described from a sprocket 113. The inclination of the helicoid 109 is such that the material engaged thereby, as hereinafter described, will be conveyed to the right in Fig. 13 through the casing 105 in a direction transversely of the machine and from this casing discharged into a chute 114 where it may be returned to the hopper 87, if desired, by any suitable means (not shown). The helicoid 109 which rotates in the direction of the arrow, in Fig. 7, and thus in the same direction as the material travels, operates to force, at all times, the material at the top of the first layer against the rear edge 107 of the casing 105, thus causing the latter to operate as a die to cause the slab as it issues from the mechanism 41 to be of substantially the same thickness except at its roll, and of substantially the same density throughout the portion of the peripheral edge of the helicoid 109 which registers with the grooved portion 108 of the casing 105 being cut away as indicated at 115 to cause the cement to pile up in a ridge, as shown at 105ª adjacent the groove 108, the helicoid 109 working against this mass of material to keep it forced up against the rear plate 107 of the housing to cause it to discharge through the groove 108 in the same way that it discharges beneath the straight portion 107 of this part of the casing. For convenience of cleaning the interior of the casing 105, the top of the casing is ported, as indicated at 116, and is provided with a cover 117 which may be secured in place, as by the wing-nuts 118.

As hereinbefore stated, the cement, after being discharged from the mechanism 41, is tamped to cause the layer on the pallets to be compacted to the desired density. In carrying out this purpose, a tamping mechanism is provided, such as that represented at 42. In the arrangement shown, the tamping of the layer is effected by three tampers represented at 119, 120 and 121. Each tamper shown comprises a tamper-proper 122 mounted at lateral extensions 123 thereon, at its ends, on the upper ends of slide-rods 124 at opposite sides of the frame of the machine, these rods being slidingly confined, to be reciprocated vertically, in guides 125 and 126 secured to the frame of the machine. The lower ends of the rods 124 coöperate with cams 127 secured to the ends of shafts 128 journaled in the frame of the machine, these shafts being connected together through the medium of gears 129, 130 and 131 rigid on these shafts, one of the latter being provided with a sprocket 132 through the medium of which all of these shafts are simultaneously rotated, there being one set of cams at each side of the machine. The cams 127 are so arranged on the shafts that the tampers will be alternately lifted and permitted to drop with each revolution of the cams, upon the cement superposed on the pallets, thus compacting it. The lower edges of the portions 122 of the tampers contain arc-shaped grooves 133 which are arranged concentric with, and in spaced relation to, the rolls 45 on the pallets 39, as illustrated in Fig. 15, whereby the layer of cement on the pallets, after it passes beyond this tamping mechanism, presents the form as shown in Fig. 36.

As hereinbefore stated, the pallets carrying this first layer of compacted cement thereon, in which condition the rolls 42 extend the full length of the slabs, then pass into a position wherein the slabs are operated on by the mechanism 46 for removing a portion of each roll 42, a description of this mechanism being as follows, reference being had more particularly to Figs. 2, 8 and 16.

This mechanism comprises a casing 134 shown in the form of a cylinder and extending across the top of the machine, with a portion of its peripheral wall cut away between the frame sides 65 and 66, as indicated at 135. The casing presents a forwardly-projecting lip 136 at its cut-away portion, which has a cutting edge 137 and which, when the casing 134 is rotated to lowermost position, extends flush with the flat portion of the upper part of the slab beneath it, thus in the movement of the slab shearing off, and removing that portion of the roll 42 which moves in contact with this cutting edge. The casing 134 is journaled on a shaft 138 which in turn is journaled at its ends in the outer extremities of levers 139 carried by a shaft 140 journaled in bearings 141 in uprights 156 rising from the sides of the frame, these levers being connected, intermediate the shafts 138 and 140, by a cross-rod 142 which coöperates with mechanism hereinafter described, for controlling the rocking of the levers 139 on their support.

The shaft 138, which is driven as hereinafter described, from a sprocket 143 thereon, carries, inside the casing 134, a spiral conveyer element 144 which operates to convey the material forming that portion of the roll 42 which is cut away, as above stated, to an opening (not shown) in the casing 134 beyond the frame of the machine and which preferably discharges the material to mechanism for reconveying it to the material-feeding mechanism of the machine. Surrounding the shaft 138 and rigidly secured to the ends of the casing 134, are gears 145 which mesh with stationary segmental racks 146 rigidly secured to the frame of the machine, whereby when the levers 139 are raised the casing 134 will be rotated in anti-clockwise direction in Fig. 8 and when these levers are lowered the casing 134 will be rotated in the opposite direction. The mechanism for controlling the raising and lowering of this cutting mechanism comprises upright rods 147 located at opposite sides of the machine and vertically reciprocable in guides 148 on the frame of the machine, the upper ends of these rods extending directly beneath the rod 142 and supporting the levers 139 and the parts carried thereby, and at their lower ends bearing against the peripheries of disks 149 fixed on a shaft 150 provided with a sprocket 151 and driven as hereinafter described, the peripheries of these disks being provided with cam-portions 152 which operate, when moved into registration with the lower ends of the rods 149, to swing the levers 139 upwardly and consequently lift the casing 134, the latter in this operation rotating as above stated. The arrangement of the parts described is such that when the rods 147 rest upon the concentric portions of the disks 149 the cutting mechanism will be in a position wherein the cutting edge 137 is flush with the flat upper portions of the slab beneath it, and thus shears off the portions of the roll 42 engaged thereby, and in the movement of the cams 152 against these rods 147 the cutting mechanism will be operated to a position wherein the cutting edge 137 will extend above the upper edge of the remaining portion of the roll 42, the cutting mechanism being illustrated in Figs. 8 and 16 in an intermediate position, or in other words, in a position it occupies immediately following the operation of removing a portion of the roll 42. In order that the operating mechanism just described be relieved of a portion of the weight of the levers 139 and the parts carried thereby, it is preferred that the casing 134 be connected with ends of cables 153 which extend partway over the curved surface of the casing 134, these cables at their opposite ends extending over sheaves 154 on a shaft 155 mounted on the uprights and being connected with weights 157 suitable for the purpose.

The condition of the slab, after passing beyond the cutting mechanism 46, is that represented of the slab in Fig. 37, the slab in this condition being ready to receive the sheet of reinforcing material 47 (Fig. 38) which is preferably shaped to conformingly fit the upper surface of the slab of Fig. 37. In the particular machine illustrated, the application of the reinforcing material to the slab is effected by hand and at that part of the machine which extends between the lines X—X and B—B on Fig. 8. As hereinbefore explained, the division-plates 79, which operate to cut upwardly through the material of the slab during the travel of the latter along that portion of the machine just described, extend up above the level of the adjacent slabs at the line X—X (Fig. 8) and thus form means extending between adjacent slabs, whereby the reinforcement 47 may be accurately positioned on the slabs thus formed, as shown in Fig. 8.

The slab thus formed with the reinforcement applied thereto as stated then passes under the roller 48, the kneader 49 and the roller 50. The roller 48, which extends crosswise of the machine and into the space between the frame sides 65 and 66, is in the form of a cylinder containing an annular groove 158 in its periphery of semicircular shape in cross-section so disposed that it registers with the rolls 42 of the slabs as they move beneath this roller, this roller which is driven as hereinafter described from a sprocket 159 secured thereto, being located at such a height that as the slab with the reinforcement thereon is carried beneath it, it will force the reinforcement down into the upper surface of the layer of the slab as so far formed, causing it to become partially embedded therein and perfectly centered.

The kneader mechanism 49 is formed of a bar 160, with its underside preferably of curved contour, as represented at 161, with a groove 162 at its underside extending crosswise of this bar and of a cross-sectional shape corresponding to that of the roll 42 of the slab and registering with the latter. The bar 160 is rigidly connected with brackets 163, which in turn are rigidly connected with a shaft 164 rigid with blocks 165 which are reciprocably confined in guides 166 secured to, and extending lengthwise of, the frame of the machine. The ends of the shaft 164 have journaled thereto the ends of arms 167, which are pivotally connected with crank-pins 168 carried by disks 169 rigid with a shaft 170 journaled in bearings 171 on the frame of the machine, this shaft being driven through the medium of a bevel pinion 172 which in turn is driven as hereinafter described. It will be understood from the foregoing that as the kneader-bar 160 is reciprocated back and forth across the cement which is exposed above the wire-mesh 47, it will spread the cement and aid in the complete embedment of the reinforcing material in the cement and straighten out the reinforcement as hereinafter explained.

The roller 50 is of the same construction as the roller 48, it being journaled on the frame of the machine to extend crosswise thereof between the frame-sides and to operate idly, it being located at such a height that it will operate to hold the reinforcing material 47, as it passes thereunder, against being tilted out of the slab in which it is embedded by the mechanism just described, thus insuring the maintenance of the reinforcing material in the proper position on the slab. It will be noted that as the reinforcing material passes under the rollers 48 and 50, it is held against displacement during the operation of the kneader-bar against it which straightens out the reinforcement if it is in distorted condition.

The spraying device represented at 51 comprises a pipe 173 which is supported to extend above the slabs and crosswise of the machine as illustrated in Fig. 21, with a discharge-section 174 through which water supplied to the pipe 173 is sprayed upon the cement as it passes beneath it. The slab is then moved to the brushing mechanism 52 by which the cement of the upper portion of the slab, which is of soup consistency, is further agitated and preferably slight additional quantities of the cement supplied from the feed mechanism 53, hereinafter described, are brushed into the upper surface of the slab. These brushing means as shown comprise three oblong, longitudinally-disposed brushes 175, 176 and 177, the bristles of which are preferably formed of relatively light gage wires, the brushes being arranged in staggered relation as shown, and rigidly connected with the lower ends of vertically-disposed shafts 178, 179, 180, respectively, these shafts being journaled in a frame 181, extending above, and supported on, the main frame of the machine, the shaft 179 by preference being vertically movable in the frame 181, in order that it may be raised so that the bristles will engage the upper portion only of the roll 42 directly beneath it, and thus avoid damage to this part of the slab, this raising of the brush 176 for this purpose being effected automatically, as hereinafter described. The shafts 178, 179, 180 carry gears 182, 183 and 184 which are constantly in mesh, the gears 182 and 184 being directly connected with the shafts 178 and 180, respectively, and the gear 183 being splined to the shaft 179 at the hub-portion 185 of this gear, as indicated at 186, to permit the shaft 179 to be raised and lowered without disturbing the driving connection therefor. The shaft 178 is rigidly connected with a bevel gear 187 which meshes with a bevel-gear 188 fixed on a shaft 189 (Fig. 3) carrying a sprocket 190, driven as hereinafter described. The mechanism for automatically raising and lowering the shaft 179, for the purpose stated, comprises a lever 191 fulcrumed, as indicated at 192, on the frame 181, this lever extending at pins 193, provided in its yoked extremity 194, into an annular groove 195 in a disk 196 rigidly connected with the upper end of the shaft 179, whereby this shaft is free to rotate but is raised and lowered in the rocking of the lever 194. The outer end of this lever is pivotally connected at 196 with the upper end of a rod 197, which in turn is pivotally connected at its lower end with a pin 198 projecting laterally from a bar 199 vertically reciprocable in guides 200 carried by the frame of the machine, the lower end of this bar bearing against the periphery of a disk 201 provided with a depressed cam surface 202, the remaining portion of the periphery of this disk being concentric with the axis of the shaft upon which it is supported and represented at 203, this shaft being driven through the medium of a sprocket 204 in a manner hereinafter described. The shaft 203 also operates as the medium through which the roller 48 is rotated, this being effected by a driving-chain connection 205 between a sprocket 206 on the shaft 203 and a sprocket 207 rigid with the roller 48, this chain running under an idler roller 208 journaled on the frame of the machine.

The parts are so arranged that during the engagement of the concentric portion of the cam disk 201, with the bar 199, the brushes 175, 176 and 177 will extend in the same horizontal plane, but when the cam surface 202 opposes the lower end of the bar 199, this bar, together with the parts connected therewith, will move to a position in which the shaft 179, with its brush, 176, is elevated, to a position in which it contacts with the extreme upper surface only of the roll 42, the parts of the machine being so constructed that the brush 176 will be raised while the roll-portion 42 of the slab is passing thereunder, but will be in lowered position to operate against the flat part of the slab during registration therewith of the plain portion thereof.

As hereinbefore stated, the next operation is the application to the slab, in so far as it has been formed by the mechanism stated, of a second, upper layer of cement, which is supplied to the first layer with the reinforcement 47 therein, by means of the mechanism represented at 53, and of which the following is a description, reference being had more particularly to Figs. 3, 4, 9, 10 and 23. This feed mechanism 53 is the same as the feed-mechanism 40, except that it is turned end for end in order that the cement, or other material to form the slab, may discharge upon the first layer, applied through the medium of the mechanism 40, immediately following the brushing operation just explained, so that the danger of the reinforcing material becoming displaced in the first layer, as by the vibration of the machine, or for other causes, is prevented, inasmuch as the second layer, so soon applied to the first layer, holds the reinforcement in place. The lateral sides of the feeding mechanism 53 are represented at 209 and 210 and its transverse rear and front sides 211 and 212, its short front plate 212 being formed with the sectional portion 213 for determining the thickness of the ribbon of material discharged from this hopper mechanism to the first layer of the slab, the material in this hopper resting upon the upper course of an endless conveyer belt 214 located below the plane of the lower edge of the section 213, with its discharge end so positioned that the ends of the brushes 175 and 176 in their rotation will extend into contact with some of the material fed thereby and thus work additional material into the slab, as hereinbefore explained, this belt being supported on rollers 215 and 216 carried by shafts 217 and 218 journaled in the sides of the hopper, these shafts rotating in clockwise direction in Figs. 9 and 10, and the shaft 218 being equipped with a sprocket 219 through the medium of which this conveyer belt is driven, as hereinafter described. The lower edge of the plate 213 is grooved as described of the plate 102 to cause the ribbon to discharge with a roll on its upper face coinciding with the roll 42.

The agitating means for coöperation with the hopper in which they are located is formed of the member 220 fixed on a shaft 222 and carrying blades 223, as explained of the corresponding member of the feed-mechanism for the first layer applied to the pallets, this shaft carrying a sprocket 224 through the medium of which this mechanism is driven, as hereinafter described. As the pallets pass under the discharge end of this feed mechanism 53, a ribbon of cement is continuously fed therethrough upon the material of the pallets and the pallets with the material thereon then pass into a position to be acted on by the surplus-removing mechanism 54 (Figs. 4 and 10) which operates to perform the same general function as performed by the mechanism 41 (Fig. 1), this mechanism being of the same construction as the mechanism 41, its cylindrical casing being represented at 225 and supported on the frame of the machine to extend transversely thereof, with its lower portion open, as shown, presenting a front edge 226 extending entirely across the space through which the material moves, and in a plane above the material and its rear edge, represented at 227, to act as a die, as explained of the rear edge 107 of the mechanism 41 and grooved midway between the frame sides 65 and 66, as explained of the casing 105, but of slightly larger dimensions to produce the roll 57 on the upper surface of the slab, and concentric with the roll 42, generally as shown in Fig. 39, the ends of the rear edge of the casing 225 at its lower open side and adjacent the frame-sides 65 and 66, being chamfered, as hereinafter described of the corners of the tampers of the mechanism 55, to produce along the opposite longitudinal edges of the slab on its upper face, lengthwise-extending rabbets. The helicoid of the mechanism 54 is represented at 228, it being located within the casing 225 and rigidly secured to a shaft 229 extending therethrough concentric with this casing, this shaft being driven through the medium of a bevel-gear 229ª, as hereinafter described. The helicoid 228 has a portion of its periphery cut away midway between the frame-sides 65 and 66, as represented at 228ª, and as explained of the helicoid 109, but to a slightly greater depth and width, to cause the material forced against the grooved rear edge 227 of the casing 225 to pile up and form a ridge on the slab, as explained of the action of the correspondingly cut-away portion of the casing 105, the action of this helicoid in connection with the formation of the rear lower edge of the casing 225, as stated, operating to force the material as through a die, causing it to discharge from this mechanism with a roll extending the full length of the slab and parallel with and equidistantly spaced from its opposite lateral edges and with flanges on the upper surface of the slab at these lateral edges.

As hereinbefore stated, the pallets with the material supplied thereto as stated, then move into a position wherein the material is acted on by the tamping mechanism 55 (Figs. 4, 10 and 23), which, as shown, comprises three tamping elements represented at 230, extending crosswise of the frame of the machine and connected at their opposite reduced ends 231 with vertically reciprocable rods 232 mounted in bearings 233 and 234 at opposite sides of the frame of the machine, and operating in conjunction with cams 235 on shafts 236, 237 and 238, as explained of the tamping mechanism 42 (Fig. 1), the shaft 238 carrying a sprocket 239 driven, as hereinafter described, and operating through gear-connections (not shown) between these shafts to drive the latter simultaneously as in the case of the construction shown at 42. The tampers 230 contain in their lower edges, midway between the frame sides 65 and 66, arc-shaped grooves which register with the roll-portions of the slab produced by expressing material through the die-portion of the casing 225, as hereinbefore explained, and the lower corners of these tampers are cut away, to cause the material on the pallets to be tamped into a condition wherein beads or flanges extend along the lateral edges of the slab on its upper surface generally as indicated in Fig. 24.

It will be understood from the foregoing that the slabs, as they leave the tamping mechanism 55, present a roll generally as shown at 57 in Fig. 39 with flanges at opposite edges and the next operation performed on the slab is that of subjecting the upper surface thereof to a kneading action for the purpose of causing its upper surface to present the proper texture, insure filling of all voids in the surface of the slab and rendering it of the proper density, and producing a smooth and substantially waterproof surface, a description of this kneading mechanism, which is represented at 58 in Fig. 5, and is also illustrated in Figs. 3, 5, 11, 25, 26, 27, 28, 29, 30 and 31, being as follows:

The kneader-bar, which is the part which directly acts against the upper surface of the material, is represented at 241, this bar extending crosswise of the frame of the machine and located within the space between the frame-sides 65 and 66. The bar 241, the bottom of which is curved transversely of its length as illustrated in Fig. 25, and carries at its forward edge a plate 242 extending the full length thereof and projecting upwardly from this bar, is formed on its underside with the concave portion 243 midway between its ends and of a shape corresponding with the shape of the finished roll 57 (Figs. 40 and 41), and at its ends with the grooves 244 extending transversely of the bar 241 and of a shape corresponding with the cross-sectional shape of the flanges or beads 56 (Figs. 39, 40 and 41). The bar 241 is rigidly connected, as by bolts (not shown) with heads 245 disposed above it, these heads being journaled at their journal-portions 246 on a shaft 247 formed in sections rigidly connected together by a sleeve-section 248, to permit the kneader-bar 241 to be rocked on the shaft 247, the bar 241 as shown in Fig. 25 extending to the right in this figure of the vertical plane in which the shaft 247 extends. This shaft extends through guides 249 secured to the top of the frame members 65 and 66 and extending lengthwise of the machine, at which portions the shaft 247 presents the rectangular-shaped bearing-portions 250 which are guidingly confined in these guides, permitting this shaft to be reciprocated, back and forth in a direction lengthwise of the machine, viz., crosswise of this shaft, but preventing rotation of this shaft. The rectangular portions 250 of the shaft 247 extend inwardly a slight distance beyond the inner faces of the guides 249 and into the heads 245, the portions of the heads 245 into which the rectangular parts 250 of the shaft 247 extend, instead of being so shaped as to cause these parts to fit snugly together, are so shaped, preferably as shown, namely, with the converging upper surfaces 251 and 252 and the converging lower surfaces 253 and 254, these pairs of surfaces meeting substantially in the vertical plane of the axis of the shaft 247 (Fig. 27), as to permit the heads 245 and consequently the bar 241, to have a limited rocking movement on the shaft 247, for a purpose hereinafter explained.

The mechanism just described coöperates with means for rocking the structure formed of the kneader-bar 241 and heads 245, on the shaft 247 in opposite directions, a description of these means being as follows:

Surrounding the shaft 247 and located between the sleeve 248 and the heads 245 are heads 255 keyed to the shaft as indicated at 256, these heads 255 being connected, each at one end, with toggles 258 positioned at one side of the center line of the shaft 247 (Fig. 27). The toggles 258 are each formed of a lever 259 pivoted between its ends as indicated at 260, to the adjacent head 255, at one side of the shaft 247, and a link 261 pivotally connected at 262 to the lower end of the link 259, and pivotally connected, as indicated at 263, with an extension 264 on the adjacent head 245. The heads 255 at the opposite side of the shaft 247 are pivotally connected, as indicated at 265, with depending rods 266 which slide in openings in members 267 pivotally connected, as indicated at 268, with extensions 269 on the heads 245, coiled springs 270 being confined between the pivots 265 and the blocks 267 and tending to rotate the structure formed of the bar 241 and heads 245 in anti-clockwise direction in Fig. 27, it being understood that according to the particular construction of the machine shown two of these spring devices are employed, one adjacent each of the heads 255. The upper ends of the levers 259 are connected together by a rod 271 which, in the position of the toggles shown in Fig. 28, oppose the extremities 272 of rock-levers 273 fulcrumed as indicated at 274 on a frame 275 secured to the guides 249, springs 276 connected with these levers and with uprights 277 on the frame 275, tending to rock these levers on their pivots 274 in clockwise direction in Fig. 25 to the position shown in this figure and Fig. 28. The frame of the machine is provided with trip-bars 278 which extend, at their outer extremities, into the path of movement of the pivotal connection 262 between the links 259 and 261 of each toggle 258, and which are in the form of bars, as shown in Fig. 25. The lever mechanism 273 and trip-bars 278 operate the toggles in opposite directions, as and for a purpose hereinafter explained. In the operation of the machine, the shaft 247, together with the parts carried thereby as stated, is caused to be moved back and forth lengthwise of the machine in the guides 249, as through the medium of the pitmen 279 pivotally connected with the ends of the shaft 247 (Fig. 29) and similarly connected with crank-pins 280, provided on disks 281 rigid on a shaft 282 journaled in bearings on the frame of the machine, this shaft being provided with a bevel-pinion 283, driven as hereinafter described.

As a preface to the description of the operation of this part of the machine, it may be stated that the kneader-bar 241, in its movement in a direction lengthwise of the machine, is caused to move in contact with the upper surface of the slab and on each return movement is automatically raised out of engagement with the material which has been kneaded by it as stated, but it sweeps against the upper portion of the material of the slab which has not been kneaded and which has been carried by the operation of the conveyer 74 into a position to be engaged by the kneader, in view of the thickness of the layer thereon as indicated in Fig. 25, and forces it backward, as shown at 284 in this figure, and in the beginning of the kneading movement engages a slight amount of this surplus material and works this into the upper surface of the slab.

Referring particularly to Fig. 28, the kneader mechanism is shown in the position it occupies substantially at the end of its return stroke, in which position the bar 271 opposes the ends 272 of the levers 273, and the bottom of the kneader-bar 241 extends above the plane of that portion of the slab which has been kneaded by this mechanism, and its engagement with the surplus material at 284, provided on the slab, as hereinbefore described.

In the movement of the shaft 247 to the left in Fig. 28, or in other words, in the direction of feed of the pallets, the engagement of the levers 273 with the toggle-levers 258, causes these toggles to swing to the position illustrated in Fig. 25 in which position the pivots 262 extend a slight distance to the left in this figure of a line connecting the centers of the pivots 260 and 263, the structure formed of the bar 241 and blocks 245 swinging upon the shaft 247 to the position shown in Fig. 25, wherein the bar 241 is in engagement with and sweeps against the upper surface of the slab, the bar 241 remaining in this position, thereby effecting a kneading of the upper surface of the slab, until the shaft 247 and parts carried thereby are moved to the left in Fig. 25 to a position wherein the bar 262 engages the trip-bars 278 and breaks the toggles 258 to the condition shown in Fig. 28, in which condition the kneader-bar 241 occupies the position relative to the shaft 247, as indicated in this last-referred to figure, and is raised from the upper surface of the slab immediately beneath it, the parts being so arranged that this breaking of the toggles occurs at the end of the movement of the shaft 247 to the left in Fig. 25. The springs 270 operate to hold the toggles against displacement when occupying the positions shown in either Figs. 25 or 28. In actual practice the parts would be so arranged that the surfaces 251 and 254, or one of them, would operate as a stop to limit the rocking of the structure formed of the kneader-bar 241 and heads 245 in anti-clockwise direction in Fig. 27, and the surfaces 252 and 253, or one of them, would operate to limit the rocking movement of these parts in the opposite direction, and the toggles would be so arranged that the swinging of the pivots 262 to the left of a line connecting the pivots 260 and 263 in Fig. 27 would be only so far beyond this line as to permit the springs 270 to releasably hold the toggles in this position.

The raising of the bar 241, as stated, on its return stroke is of advantage not only in connection with the feeding of excess material by this bar in its downward movement toward the slab as hereinbefore explained, but also because thereby the bar 241 does not move against the kneaded portion of the slab while this bar moves in a direction opposite to the travel of the pallets which avoids rifts and voids being formed in the slab and which if existing, would render the slab defective.

The mechanism shown for removing a portion of the excess material 284 as it is piled up by the action of the kneader-bar 241 on its return strokes, as stated, comprises a casing 285 of cylindrical form which is supported on the frame of the machine to extend at its lower side into the space between the frame-sides 65 and 66, its lower rear wall being cut away, as indicated in Fig. 25, through which opening the excess material enters this casing. The casing 285 contains a spiral conveyer 286, the spiral portion of which is mounted on a shaft 287 extending lengthwise and concentrically through the casing 285, and journaled in bearings (not shown) on the frame of the machine, this shaft being equipped with a sprocket 288 for driving the conveyer, which operates to feed the material through the casing 285 and out through the discharge end thereof (not shown) beyond the frame of the machine, thus operating to leave in position on the slabs as they pass through this part of the machine sufficient excess of the material at 284 to permit the kneader 241 to rub surplus material into the top of the slab while removing unnecessary surplus. It may be stated that the forward wall of the casing 285 would be provided, intermediate the lateral sides of the slabs, with a cutaway portion and the spiral 286 of the conveyer would also be cut away, as explained of the spiral 109 at those parts of the structure which register with the roll 57, to avoid impairing this part of the slab.

As hereinbefore described, the pallets 39, with the slabs thus formed upon them, are then moved into a position to be operated on by the roll-cutting mechanism 59 of which the following is a description:

Extending transversely of the frame of the machine, and movable up and down thereon, is a cylindrical casing 289 (Figs. 5 and 11), this casing being of the same construction as the casing 134 of Fig. 8, with its cutaway portion represented at 290, flanked by a lip 291, as explained of the casing 134, this cutaway portion extending in the same vertical plane as the roll 57 of the slab, a portion of which is to be removed.

The casing 289 contains a shaft 292 extending concentrically and longitudinally therethrough and carrying a spiral-conveyer 293 for conveying the material, cut from the roll 57 by the plate 291, to the outlet (not shown) of the casing 289 and located laterally beyond the pallets. The casing 289 has rigid therewith at its ends, sprockets 294 which engage segmental racks 295 stationarily secured to the frame of the machine at its opposite sides. The ends of the shaft 292, which carries a sprocket 296, are journaled in the outer ends of a pair of levers 297, fulcrumed at their opposite ends on a shaft 298 in uprights 299 rising from the frame of the machine, these levers being connected intermediate the shafts 292 and 298 by a bar 300 which extends directly above and is supported in bearings at the opposite sides of the machine, as represented at 302 of the rods 301, as shown in Fig. 5. The lower ends of these rods rest upon the peripheries of disks 303 secured to a shaft 304 driven from a sprocket 305, these disks being located at opposite sides of the machine and containing depressed cam surfaces 306. The operation of this cutting mechanism 59 is substantially like that of the mechanism 46, the cams 306 in the rotation of the disks 303 operating to permit the levers 297, with the parts carried thereby, as stated, to lower, with the effect of causing the casing 289 to rotate in clockwise direction in Figs. 5 and 11 and position the cutting-member 291 for removing portions of the rolls 57 at adjacent ends of the slabs, as shown in Figs. 11 and 40, it being noted that the amount of the roll removed by this operation is much less than that removed by the cutting mechanism 46. By preference, the mechanism 59 also includes means for partially counterbalancing the weight of the levers 297 and parts carried thereby, these means comprising the cables 307, one at each side of the machine, connected with the casing 289 and partially encircling the circular wall of the latter, and extending over pulleys 308 journaled on the uprights 299 at which ends they are connected with weights 309, as explained of the construction 46.

The slab, as it passes beyond the mechanism just described, is thence moved by the conveyer mechanism to a position in which it is subjected to the flange-cutting mechanism 60, for cutting off the ends of the flanges 56, as indicated at 61 and 62 (Fig. 41), a description of this mechanism being as follows:

Mounted on jack-shafts 310 journaled on the frame of the machine at opposite sides thereof, to extend lengthwise of the machine, are disks 311 which extend transversely of the machine and are connected at their upper portions with springs 312 attached, as represented, at 313 to an upright 314 rising, at a point midway between the sides of the machine, from an angle-bar 315, with which it is connected, this bar extending transversely of the machine and being connected with the frame-members 65 and 66. The disks 311 are pivotally connected, as indicated at 316, at points below the shafts 310, with links 317 which are pivotally connected midway between the side frames 65 and 66 by a pin represented at 318, this pin being pivotally connected with the lower end of a link 319 pivotally connected at 320 with the lower end of another link 321, which is pivotally connected at 322 with one arm of a bell-crank lever 323 fulcrumed on a shaft 324 mounted in uprights 325 secured to, and rising from the frame-sides of the machine, the other end of the bell-crank 323, which is preferably provided with a roller 326, bearing against the periphery of a cam 327, rigidly secured to a shaft 328 journaled in the uprights 325 and driven through the medium of a sprocket 329, as hereinafter described, the springs 312 tending to rotate the disk 311 at the left-hand side of Figs. 33 and 34, in clockwise direction, and the disk 311 at the right-hand side of these figures, in the opposite direction, the cam 327 being so shaped that when the roller 326 engages its highest point, as represented in Fig. 32, the parts of this mechanism will extend in the position shown in Figs. 32 and 33, and when this roller engages the lowest portion 330 of the cam 327, the parts will be in the position shown in Fig. 34 and in full lines in Fig. 35. Each of the disks 311 carries a cutting member 331, these cutting-members being pivoted on the pins 316 and having extensions 332, on the extremities of which the cutting edges 333 are provided. Each member 331 is provided with a laterally-projecting pin 334 into the path of movement of which, in either direction, when the disks 311 are rotated, as hereinbefore stated, extend depending members 335 and 336 of plates 315$^a$ secured to the angle-iron 315.

Coöperating with these rock-members 331 are leaf-springs 337 rigidly secured to the disks 311 and adapted to bear at their free extremities against either of the flat surfaces 338 or 339 of the members 331, depending upon the position occupied by these members. The parts just described are so constructed and arranged as shown that immediately preceding the registration of the adjacent ends of slabs, in passing through the machine, with the plane in which the members 331 oscillate, the roller 326 of the lever 323 will engage the high point of the cam, in which position of the parts the cutters 333 extend in the position shown in Fig. 33, namely, at the inside of the flanges 56, and in the plane of the upper surface of the main portion of the slabs, and as soon as the joint between the slabs, as stated, registers with the plane in which these cutter-surfaces oscillate, the cam 327 has moved to a position in which the roller 326 radially opposes the low portion 330 of the cam, with the result that the springs 312 quickly rotate the disks 311, as hereinbefore stated, to move the cutting edges 333 transversely of the machine, from the position shown in Fig. 33 to the position shown in Fig. 34, thereby clipping off the ends of adjacent flanges 56, as stated, and indicated at 61 and 62 (Fig. 41), the springs 337 being in engagement at their free flexible ends, with the surfaces 338 of the members 331 during this flange-cutting operation.

In the final movement, however, of the disks 311, as stated, the pins 334 engage the outer trip surfaces 335, with the result of rotating the members 331 on their pivots 316, to throw the extensions 332 upwardly and outwardly as shown in Fig. 34, the springs 337 in this operation engaging with the flat surfaces 338 of the members 331, to releasably hold the latter in the position to which they were rotated by engagement of the pins 334 with the trip surfaces 335, and thus are in a position to clear the upper edges of the flanges 56 of the slab moving beneath them, until they have been moved inwardly beyond the inner edges of these flanges, whereupon the pins 334 engage the trip-surfaces 336 and swing the members 331 to the position illustrated in Fig. 33, the engagement of the springs 337 shifting to the surfaces 339, this operation for returning the cutter-members 331 to cutting position without striking the flanges 56 of the slabs passing beneath them, being represented by dotted lines in Fig. 35.

The clipping off of the ends of the flanges 56 as stated is the last operation of the particular construction of machine illustrated, so far as the shaping of the material into a slab is concerned, the slab, as it emerges from this cutting mechanism being of the form shown in Fig. 41. It is, however, desirable, under some conditions, that the upper surface of the slab be colored, and to this end the machine is equipped with a paint-spraying apparatus 63, this apparatus comprising a tank 341 for the paint, supported on standards 342 rising from the frame of the machine and connected at the outlet thereof at its lower end, with a pipe 343 which connects with the casing 344 of an air brush of any desirable construction positioned on the frame of the machine, to spray the color over the entire surface of the slabs in their passage through this part of the machine, the air-brush 334 being connected with a supply (not shown) of air under pressure conducted thereto through the pipe 345.

In the arrangement shown, the pallets 39 move at their forward ends to a position where they engage the periphery of rollers 346 on shafts 347 journaled in the frame of the machine, and from thence the pallets pass to a conveyer shown of the endless chain type 348, which is preferably operated at a speed greater than the pallet-feeding means of the machine which causes each pallet, as it is engaged by the conveyer 348, to speed ahead of the following pallet, preventing possibility of impairing the ends of the slabs.

A description of the driving connections for the various mechanisms of the machine is as follows:

Extending lengthwise of the machine at one side thereof and journaled at intervals along the latter is a main shaft 349 which may be driven in any suitable manner, as from a motor, indicated at 350. The shaft 349 carries a worm 351, bevel-pinions 352, 353 and 354 and a worm 355. The worm 351 (Fig. 2) meshes with a worm-wheel 356, secured to a shaft 357 journaled in the frame of the machine, this shaft having rigidly secured thereto sprockets 358 and 359, the sprocket 358 being connected, by means of a chain 360, with the sprocket 151, and the sprocket 359 being connected, by means of a chain 361, with the sprocket 204, whereby the roll-cutting mechanism 46, the roller 48 and the mechanism for raising and lowering the brush 176, are operated. The pinion 352 (Fig. 3) meshes with a bevel-pinion 362 rigid on the lower end of a vertical shaft 363 journaled in the frame of the machine and carrying a bevel-gear 364 meshing with the bevel-gear 172 on the shaft 171 of the kneader-mechanism 49 (Fig. 3) for driving this mechanism. The bevel-pinion 353 (Fig. 4) meshes with a bevel pinion 365 rigid on the lower end of a vertical shaft 366 journaled in the frame of the machine, this shaft being equipped with a bevel-pinion 367 which meshes with the bevel-pinion 229$^a$ on the shaft 229. The shaft 229 also carries at one end two sprocket-wheels of substantially the same diameter, only one of which is shown at 368, the sprocket 368 connecting, by a chain 369, with the sprocket 239 and the other sprocket (not shown), connecting by a chain 370 with the sprocket 190, whereby the brushing mechanism 52 and the tamping mechanism 55 are operated from this shaft. The shaft 229 is provided at its opposite end with sprockets 371 and 372, the sprocket 371 being connected by a chain 373 with the sprocket 296 and the sprocket 372 being connected through the sprocket-chain 374 with the sprocket 219, this sprocket-chain meshing with the sprocket 224 on the shaft 222 (Fig. 10) and passing over idler sprockets 375 and 376 journaled exteriorly of the hopper, as shown in Fig. 10, whereby the conveyer 293 of the roll-cutting mechanism 59 (Figs. 5 and 11), the cement-conveyer 214 and the agitator mechanism of the hopper last-refered-to are operated from the shaft 229.

The gear 354 (Fig. 5) meshes with a bevel-gear 375$^a$ rigidly secured to the lower end of a vertical shaft 376$^a$, journaled in the frame of the machine and equipped at its upper end with a bevel-pinion 377 which meshes with the bevel-pinion 283 on the shaft 282, for operating the kneader-mechanism 58, this shaft being provided with a sprocket 378, connected by means of a sprocket-chain 379 with the sprocket 288 on the shaft 287, for operating the spiral conveyer 286 (Fig. 25).

The worm 355 (Fig. 5) meshes with a worm-wheel 380 rigidly secured to a shaft 381 journaled in the frame of the machine and provided with a sprocket 382 connected, by a sprocket chain 383, with the sprocket 305, the shaft 304 also carrying a sprocket 384 connected, by means of a sprocket-chain 385, with the sprocket 329 on the shaft 328 of the flange-cutting mechanism 60, for actuating this mechanism.

The conveyer-chains 74 are driven through the medium of a chain 386 engaging a sprocket 387 (Fig. 5) fixed on the shaft 381 and a sprocket 388 fixed on the shaft 178 (Fig. 6), the shaft 78 also carrying a sprocket 389 connected by means of a sprocket-chain 390 and sprocket 391, with the shaft 347 for driving the rollers 346. The shaft 77 (Figs. 1 and 7), driven by the engagement of the conveyer-chains 74 with the sprocket 75, carries a sprocket 392, engaged by a sprocket-chain 393, which passes over a sprocket 394 fixed on the shaft 95 and engages the sprocket 100 on the shaft 99, this chain passing over idlers 395 and 396 journaled on the hopper 91 exteriorly thereof. The driving connection just stated not only serves to drive the material-feeding belt 92 but also to actuate the feed mechanism on the shaft 99. The shaft 95 (Fig. 1) carries a sprocket 397 connected by a sprocket-chain 398 with a sprocket 399 on a shaft 400 journaled on the frame of the machine, this shaft also being equipped with a gear 401 which meshes with the gear 113 on the shaft 110. The shaft 110 carries a sprocket 110ª which connects with the sprocket 132 on the shaft 128 by means of a sprocket-chain 403, and a sprocket-chain 404 connects a sprocket 405 on the shaft 110, with the sprocket 143 of the roll-cutting mechanism 46. The connections just stated operate as a drive for the conveyer 109 of mechanism 41 (Fig. 1), the tamping mechanism 42 and the conveyer 144 of the roll-cutting mechanism 46.

It may be here stated that the conveyer-chains 74 will be constantly driven to continuously feed the pallets 39 through the machine, and cause the conveyer-belt 92 of the first hopper and agitating means therein, as well as the tamping mechanism 42, the conveyer of mechanism 46, the helicoid 109 of the mechanism 41, and the ejecting rollers 346 to rotate continuously. The shaft 349 is also continuously driven, with the result of continuously rotating the cams 149 of the mechanism 46 (Fig. 8), the roller 48 (Fig. 3), the cams 201 (Fig. 3), the mechanism for driving the kneader 161 (Fig. 3), the brush devices 52, the conveyer belt 214 (Fig. 10), the helicoid 228 of the mechanism 54, the conveyer 293 (Fig. 11), the driving means for the kneader 58 (Fig. 5), the cam 327 (Fig. 5), the cams 303 (Fig. 5), the rollers 346 (Fig. 12), and the surplus-removing conveyer 286. The driving connections referred to would be so proportioned in practice that the helicoid of the mechanism 41 would cause the material to be constantly piled up against the rear wall of the casing 105, the roll-cutting mechanism 46 to be lowered into cutting position, for cutting away the rolls 42 at equal distances from the alternate joints between the slabs as they pass through the machine, the roller mechanism 48 to rotate at such speed as to cause its surface speed to be substantially the same as the speed of travel of the slabs through the machine, the kneader-bar 241 to travel in engagement with the slab in moving to the left in Fig. 25 at a slightly greater speed than the travel of the slab through the machine; the roll-cutting mechanism 59 to be lowered into operating position relative to the roll for cutting away the latter at equal distances at opposite sides of alternate joints between the slabs, the flange-cutting mechanism 60 to operate to cut the flanges as each joint between the slabs is carried into registration with this mechanism, and the conveyer-belts of the two hopper mechanisms preferably at the speed of the pallets through the machine.

When it is desired that slabs of other forms be manufactured, the parts of the machine will be altered accordingly. Thus, if it is desired that a slab presenting a plane upper surface be made, the various mechanisms described as formed to provide the cut-away portions to form a roll would be altered not to form a roll but to form a plane upper surface and the roll-cutting mechanism would be eliminated, as also the flange-cutting mechanism of the slab when not formed with the flanges at its sides. Furthermore, various alterations and modifications may be made in the particular construction of machine illustrated without departing from the spirit of my invention, and as regards the method employed, it may be practised by employing constructions other than that illustrated and described.

What I claim as new and desire to secure by Letters Patent is—

1. In a machine of the character set forth, the combination of means for advancing a support upon which the slab is to be formed and carrying compacted cement, or the like, and means for kneading the upper surface of said material.

2. In a machine of the character set forth, the combination of means for advancing a support upon which the slab is to be formed and carrying compacted cement, or the like, means for pressing into said material reinforcement applied to the upper surface thereof, and means for kneading the upper surface of said material to embed said reinforcement.

3. In a machine of the character set forth, the combination of means for advancing a support upon which the slab is to be formed and carrying compacted cement, or the like, means for pressing into said material reinforcement applied to the upper surface thereof, means for kneading the upper surface of said material to embed said reinforcement, and means beyond said kneading means, for preventing displacement of the reinforcement in said material.

4. In a machine of the character set forth, the combination of means for advancing a support upon which the slab is to be formed and carrying compacted cement, or the like, roller means for pressing into said material reinforcement applied to the upper surface thereof, and means for kneading the upper surface of said material to embed said reinforcement.

5. In a machine of the character set forth, the combination of means for advancing a support upon which the slab is to be formed, and carrying compacted cement, or the like, roller means for pressing into said material reinforcement applied to the upper surface thereof, means for kneading the upper surface of said material to embed said reinforcement, and a roller beyond said kneading means for preventing displacement of the reinforcement in said material.

6. In a machine of the character set forth, the combination of means for advancing a support upon which the slab is to be formed, means for supplying cement, or the like, to said support, means for compacting the material on said support, and means for kneading the upper surface of said material.

7. In a machine of the character set forth, the combination of means for advancing a support upon which the slab is to be formed, means for supplying cement, or the like, to said support, means for compacting the material on said support, roller means for pressing into said material reinforcement applied to the upper surface thereof, means for kneading the upper surface of said material to embed said reinforcement, and a roller beyond said kneading means for preventing displacement of the reinforcement in said material.

8. In a machine of the character set forth, the combination of means for advancing a support upon which the slab is to be formed, means for supplying cement, or the like, to said support, means for compacting the material on said support, roller means for pressing into said material reinforcement applied to the upper surface thereof, means for kneading the upper surface of said material to embed said reinforcement, a roller beyond said kneading means for preventing displacement of the reinforcement in said material, and means for applying a second layer of cement, or the like, to the first layer thereof with the reinforcement therein.

9. In a machine of the character set forth, the combination of means for advancing a support upon which the slab is to be formed, and carrying compacted cement, or the like, with reinforcement on its upper surface, means for pressing the reinforcement at a plurality of spaced points in a direction to embed it in the material, and means located between said points and operating to travel against the reinforcement between said points while engaged by said second-named means.

10. In a machine of the character set forth, the combination of means for advancing a support upon which the slab is to be formed, and carrying compacted cement, or the like, means for kneading the upper surface of said material, and means for brushing the upper surface of the material.

11. In a machine of the character set forth, the combination of means for advancing a support upon which the slab is to be formed, and carrying compacted cement, or the like, means for pressing into said material reinforcement applied to the upper surface thereof, and means for kneading the upper surface of said material to embed said reinforcement.

12. In a machine of the character set forth, the combination of means for advancing a support upon which the slab is to be formed and carrying compacted cement, or the like, means for pressing into said material reinforcement applied to the upper surface thereof, means for kneading the upper surface of said material to embed said reinforcement, and means for brushing the upper surface of the material.

13. In a machine of the character set forth, the combination of means for advancing a support upon which the slab is to be formed and carrying compacted cement, or the like, means for pressing into said material reinforcement applied to the upper surface thereof, means for kneading the upper surface of said material to embed said reinforcement, means for brushing the upper surface of the material, and means for applying to said first layer of material a second layer of cement, or the like.

14. In a machine of the character set forth, the combination of means for advancing a support upon which the slab is to be formed and carrying a layer of compacted cement, or the like, means for supplying to said layer a second layer of cement, or the like, means for compacting said second layer, and means for kneading said second layer.

15. In a machine of the character set forth, the combination of means for advancing a support upon which the slab is to be formed and carrying a layer of compacted cement, or the like, means for pressing into said material reinforcement applied to the upper surface of said layer, means for supplying to said layer a second layer of cement, or the like, and means for kneading said second layer.

16. In a machine of the character set forth, the combination of means for advancing a support upon which the slab is to be formed and carrying a layer of compacted cement, or the like, means for pressing into said material reinforcement applied to the upper surface of said layer, means operating against the material to embed the reinforcement therein, means for supplying to said layer a second layer of cement, or the like, means for compacting said second layer, and means for kneading said second layer.

17. In a machine of the character set forth, the combination of means for advancing a support upon which the slab is to be formed and carrying a layer of compacted cement, or the like, means for pressing into said material reinforcement applied to the upper surface of said layer, means operating against the material to embed the reinforcement therein, means for thinning the upper surface of the layer, means for brushing the upper surface of said layer, means for supplying to said layer a second layer of cement, or the like, means for compacting said second layer, and means for kneading said second layer.

18. In a machine of the character set forth, the combination of means for advancing a support upon which the slab is to be formed, means for forming on said support a slab of cement, or the like, presenting a projection along a face thereof, and means operating to remove an end portion of said projection.

19. In a machine of the character set forth, the combination of means for advancing a support upon which the slab is to be formed, means for forming on said support a slab of cement, or the like, presenting a roll along a face thereof between its edges, and means operating to remove an end portion of said roll.

20. In a machine of the character set forth, the combination of means for advancing a support upon which the slab is to be formed, means for forming on said support a slab of cement, or the like, presenting a flange along one edge thereof, and means operating to remove an end portion of said flange.

21. In a machine of the character set forth, the combination of means for advancing a support upon which the slab is to be formed, means for forming on said support a slab of cement, or the like, presenting a projection extending lengthwise thereof along a face of the slab between its lateral edges and projections extending lengthwise thereof at its lateral edges, and means operating to remove the ends of said projections.

20. In a machine of the character set forth, the combination of means for advancing a support upon which the slab is to be formed, means for forming on said support a slab of cement, or the like, presenting a projection along a face thereof, means operating to remove an end portion of said projection, means for supplying to said layer, a second layer of cement, or the like, means operating upon this second layer to unite it with the first layer and cause the slab to present a projection extending the full length of the slab, and means operating to remove an end portion of the projection presented by the slab after the second layer has been applied thereto as stated.

23. In a machine of the character set forth, the combination of means for advancing a support upon which the slab is to be formed and to which slab-forming material is supplied, a member positioned to extend above said support, and means operating against the upper portion of the material on the support and independently of the feeding of the material to the support, for continuously forcing the material against said member in the direction of movement of said support at a speed greater than the speed of movement of said support.

24. In a machine of the character set forth, the combination of means for advancing a support upon which the slab is to be formed and to which slab-forming material is supplied, a member positioned to extend above said support, and means acting against the upper portion of the material on said support for continuously forcing it against said member in the direction of movement of said support, and removing the surplus material from said support.

25. In a machine of the character set forth, the combination of means for advancing a support upon which the slab is to be formed and to which slab-forming material is supplied, a member positioned to extend above said support, and a spiral conveyer engaging the material on said support and operating to continuously force it against said member in the direction of movement of said support and remove the surplus material from the latter.

26. In a machine of the character set forth, the combination of means for advancing a support upon which the slab is to be formed and to which slab-forming material is supplied, a casing extending crosswise of the path of movement of said support and containing an opening in its lower side presenting an edge extending above said support, and a spiral conveyer rotatable in said casing and operating to engage the material on said support and continuously force it against the rear wall of said casing at its open portion in the direction of movement of said support and convey the surplus material along the casing.

27. In a machine of the character set forth, the combination of means for advancing a support upon which the slab is to be formed and to which slab-forming material is supplied, a member positioned to extend above said support and containing a groove in its lower edge extending crosswise thereof, and a spiral conveyer engaging the material on said support and operating to continuously force it against the lower edge of said member in the direction of movement of said support, the periphery of said conveyer being partly cut away in registration with said groove, for the purpose set forth.

28. In a machine of the character set forth, the combination of means for advancing a support upon which the slab is to be formed, means for supplying cement, or the like, to said support, means for compacting the material on said support, a casing extending crosswise of the path of movement of said support and containing an opening in its lower side, presenting an edge extending above said support, the lower edge of said casing containing a groove extending crosswise of this lower edge, and a spiral conveyer rotatable in said casing and operating to engage the material on said support and continuously force it against said grooved lower edge of the casing in the direction of movement of said support, the periphery of said conveyer being partly cut away in registration with said groove, for the purpose set forth.

29. In a machine of the character set forth, the combination of means for advancing a support upon which the slab is to be formed, means for forming on said support a slab having a projection on its upper surface extending lengthwise thereof, and means for removing a portion of said projection, comprising a cutter-member mounted to be raised and lowered relative to said support and into and out of engagement with said projection, and means for actuating said member.

30. In a machine of the character set forth, the combination of means for advancing a support upon which the slab is to be formed, means for forming upon said support a slab having a projection on its upper surface extending lengthwise thereof, and means for removing a portion of said projection comprising a cutter-member mounted to be rotatable and movable toward and away from said support into and out of engagement with said projection, and means for rotating said member.

31. In a machine of the character set forth, the combination of means for advancing a support upon which the slab is to be formed, means for forming upon said support a slab having a projection on its upper surface extending lengthwise thereof, and means for removing a portion of said projection comprising a cutter-member mounted to be raised and lowered relative to said support, means for actuating said member, and means for conducting away the material removed by said cutter-member.

32. In a machine of the character set forth, the combination of means for advancing a support upon which the slab is to be formed, means for forming upon said support a slab having a projection on its upper surface extending lengthwise thereof, and means for removing a portion of said projection comprising a cutter-member mounted to be rotatable and movable toward and away from said support into and out of engagement with said projection, means for actuating said member, and means for conducting away the material removed by said cutter-member.

34. In a machine of the character set forth, the combination of means for advancing a support upon which the slab is to be formed, means for forming upon said support a slab having a projection upon its upper surface extending lengthwise thereof, and means for removing a portion of said projection comprising a cutter-member mounted to be raised and lowered relative to said support into and out of engagement with said projection, means for actuating said member, and a spiral conveyer for conducting away the material removed by said cutter-member.

34. In a machine of the character set forth, the combination of means for advancing a support upon which the slab is to be formed, means for forming upon said support a slab having a projection on its upper surface extending lengthwise thereof, and means for removing a portion of said projection comprising a second support movable toward and away from said first-named support, a casing rotatably mounted on said second support, means engaging said casing for rotating it upon raising and lowering said second support, said casing being open at one side and presenting a cutting edge engaging said projection when said casing is in lowered position, a conveyer in said casing, and means for actuating said conveyer.

35. In a machine of the character set forth, the combination of means for advancing a support upon which the slab is to be formed, means for forming upon said support a slab having a projection on its upper surface extending lengthwise thereof, and means for removing a portion of said projection comprising a second support movable toward and away from said first-named support, a casing rotatably mounted on said support, a rack stationary relative to said casing, a gear on said casing engaging said rack and operating to rotate said casing upon raising and lowering said second support, said casing being open at one side and presenting a cutting edge for engaging said projection when said casing is in lowered position, a conveyer in said casing, and means for actuating said conveyer.

36. In a machine of the character set forth, the combination of means for advancing a support upon which the slab is to be formed, means for forming upon said support a slab having a projection on its upper surface extending lengthwise thereof, and means for removing a portion of said projection comprising levers fulcrumed on the machine, a casing rotatably mounted on said levers, means engaging said casing for rotating it upon rocking said levers, said casing being open at one side and presenting a cutting edge for engaging said projection when said casing is in lowered position, a conveyer in said casing, and means for actuating said conveyer.

37. In a machine of the character set forth, the combination of means for advancing a support upon which the slab is to be formed, means for forming upon said support a slab having a projection on its upper surface extending lengthwise thereof, and means for removing a portion of said projection comprising levers fulcrumed on the machine and movable toward and away from said first-named support, a casing rotatably mounted on said levers, a rack mounted stationary relative to said casing, a gear on said casing and engaging said rack and operating to rotate said casing upon actuating said levers, said casing being open at one side and presenting a cutting edge for engaging said projection when said casing is in lowered position, a conveyer in said casing and means for actuating said conveyer.

38. In a machine of the character set forth, the combination of means for advancing a support upon which the slab is to be formed, means for forming upon said support a slab having a projection on its upper surface extending lengthwise thereof, and means for removing a portion of said projection, comprising a cutter-member mounted to be raised and lowered relative to said support into and out of engagement with said projection, and cam means for actuating said member.

39. In a machine of the character set forth, the combination of means for advancing a support upon which slabs are to be formed, means for forming upon said support slabs arranged in end to end relation with alining projections on their upper surfaces extending lengthwise thereof, and means operating automatically to remove portions of said projections in equal amounts from adjacent ends of the slabs.

40. In a machine of the character set forth, the combination of means for advancing pallets in end to end relation and upon which the slabs are to be formed, means for forming upon said pallets slabs having alining projections on their upper surfaces extending lengthwise thereof, and means operating automatically to remove portions of said projections in equal amounts from adjacent ends of the slabs.

41. In a machine of the character set forth, the combination of means for advancing pallets in end to end relation upon which the slabs are to be formed, means for forming upon said pallets slabs having alining projections on their upper surfaces extending lengthwise thereof, means operating automatically to remove portions of said projections in equal amounts from adjacent ends of the slabs comprising a cutter-member mounted to be raised and lowered relative to said support into and out of engagement with said projections, and means operating automatically to lower said cutter-member into engagement with the projection on one slab at a point intermediate the ends of this slab, and lift said cutter-member out of engagement with the projection on the next succeeding slab while said cutter-member is in engagement with this last-referred-to projection intermediate the ends of this slab.

42. In a machine of the character set forth, the combination of means for advancing a support upon which the slab is to be formed and to which slab-forming material is supplied, and kneader mechanism for kneading the material comprising a kneader element movable into and out of contact with the material, and means operating to move said element in one direction over the material and in contact therewith in a direction lengthwise of the path of movement of said support and to move said element in the opposite direction out of contact with the kneaded portion of the material.

43. In a machine of the character set forth, the combination of means for advancing a support upon which the slab is to be formed and to which slab-forming material is supplied, and kneader mechanism for kneading the material comprising a kneader-element movable into and out of contact with the material and reciprocable lengthwise of the path of movement of said support, and means operating to move said element in one direction over the material and in contact therewith in a direction lengthwise of the path of movement of said support and to move said element in the opposite direction out of contact with the kneaded portion of the material.

44. In a machine of the character set forth, the combination of means for advancing a support upon which the slab is to be formed and to which slab-forming material is supplied, and kneader mechanism for kneading the material comprising a kneader element mounted to be moved into and out of contact with the material reciprocable lengthwise of the path of movement of said support, means for reciprocating said element, and means operating automatically to cause said kneader-element to be in contact with the material when moved in one direction lengthwise of the path of movement of said support and be out of contact with the kneaded material upon its movement in the opposite direction.

45. In a machine of the character set forth, the combination of means for advancing a support upon which the slab is to be formed and to which slab-forming material is supplied, and kneader mechanism for kneading the material comprising a kneader-element movable into and out of contact with the material, and means operating to move said element over the material and in contact therewith in a direction lengthwise of the path of movement of said support, and to move said element in the opposite direction out of contact with the kneaded portion of the material.

46. In a machine of the character set forth, the combination of means for advancing a support upon which the slab is to be formed and to which slab-forming material is supplied, and kneader mechanism for kneading the material comprising a kneader-element pivotally supported to be movable into and out of contact with the material and movable lengthwise of the path of movement of said support, and means operating to move said element in one direction over the material and in contact therewith in a direction lengthwise of the path of movement of said support and to move said element in the opposite direction out of contact with the kneaded portion of the material.

47. In a machine of the character set forth, the combination of means for advancing a support upon which the slab is to be formed and to which slab-forming material is supplied, and kneader mechanism for kneading the material comprising a kneader-element pivotally supported to be movable into and out of contact with the material and movable lengthwise of the path of movement of said support, means operating to reciprocate said element, and means for rocking said element in opposite directions at opposite ends of its path of reciprocation.

48. In a machine of the character set forth, the combination of means for advancing a support upon which the slab is to be formed and to which slab-forming material is supplied, and kneader mechanism for kneading the material comprising a member supported to be reciprocated lengthwise of the path of movement of said support, a kneader-element pivotally supported on said member, means for reciprocating said member, and means for rocking said element on said member at opposite ends of the path of reciprocation of said member.

49. In a machine of the character set forth, the combination of means for advancing a support upon which the slab is to be formed and to which slab-forming material is supplied and kneader mechanism for kneading the material comprising a member supported to be reciprocated lengthwise of the path of movement of said support, a kneader-element pivotally supported on said member, means for reciprocating said member, toggle-mechanism connected with said support and said kneader-element for rocking the latter on said member, and means for actuating said toggle.

50. In a machine of the character set forth, the combination of means for advancing a support upon which the slab is to be formed and to which slab-forming material is supplied and kneader mechanism for kneading the material comprising a member supported to be reciprocated lengthwise of the path of movement of said support, a kneader-element pivotally supported on said member, means for reciprocating said member, toggle-mechanism connected with said support and said kneader-element for rocking the latter on said member, and means for actuating said toggle-mechanism in opposite directions at opposite ends of the path of reciprocation of said member, for the purpose set forth.

51. In a machine of the character set forth, the combination of means for advancing a support upon which the slab is to be formed and to which slab-forming material is supplied and kneader mechanism for kneading the material comprising a member supported to be reciprocated lengthwise of the path of movement of said support, a kneader-element pivotally supported on said member, means for reciprocating said member, toggle-mechanism connected with said support and said kneader-element for rocking the latter on said member, means located adjacent the end of movement of said member in one direction for actuating said toggle-mechanism in one direction, and means located at the opposite end of movement of said member for actuating said toggle-mechansm in the opposite direction.

52. In a machine of the character set forth, the combination of means for advancing a support upon which the slab is to be formed and to which slab-forming material is supplied, and kneader mechanism for kneading the material comprising a member supported to be reciprocated lengthwise of the path of movement of said support, a kneader-element pivotally supported on said member and located to one side of the vertical plane in which said pivot extends, means for reciprocating said member, and means for rocking said element on said member.

53. In a machine of the character set forth, the combination of means for advancing a support upon which the slab is to be formed and to which slab-forming material is supplied, and kneader mechanism for kneading the material comprising a kneader-element movable into and out of contact with the material with its kneading surface curved transversely of said element, and means operating to move said element in one direction over the material and in contact therewith in a direction lengthwise of the path of movement of said support and to move said element in the opposite direction, out of contact with the kneaded portion of the material.

54. In a machine of the character set forth, the combination of means for advancing a support upon which the slab is to be formed and to which slab-forming material is supplied, and kneader-mechanism for kneading the material comprising a pivotally-supported kneader-element movable into and out of contact with the material, with its bottom surface curved transversely of said element, and means operating to move said element in one direction over the material and in contact therewith in a direction lengthwise of the path of movement of said support and to move said element in the opposite direction out of contact with the kneaded portion of the material.

55. In a machine of the character set forth, the combination of means for advancing a support upon which the slab is to be formed and to which slab-forming material is supplied, and kneader mechanism for kneading the material comprising a kneader-element movable into and out of contact with the material, and means operating to move said element in one direction and over the material and in contact therewith in a direction lengthwise of the path of movement of said support and to move said element in the opposite direction out of contact with the kneaded portion of the material adjacent thereto, whereby said element in moving in the direction of kneading operates to work into the material as it passes over the same portions of the material engaged by it at the beginning of its kneading movement.

56. In a machine of the character set forth, the combination of means for advancing a support upon which the slab is to be formed and to which slab-forming material is supplied, kneader mechanism for kneading the material comprising a kneader-element movable into and out of contact with the material, means operating to move said element in one direction and over the material and in contact therewith in a direction lengthwise of the path of movement of said support and to move said element in the opposite direction out of contact with the kneaded portion of the material adjacent thereto, whereby said element in moving in the direction of kneading operates to work into the material as it passes over the same portions of the material engaged by it at the beginning of its kneading movement, and means for removing from the material on said support, surplus material pushed backwardly by said kneader-element.

57. In a machine of the character set forth, the combination of means for advancing a support upon which the slab is to be formed and to which slab-forming material is supplied, and kneader mechanism for kneading the material comprising a kneader-element movable into and out of contact with the material, and means operating to move said element in the direction of travel of said support, over the material and in contact therewith, and to move said element in the opposite direction out of contact with the kneaded portion of the material, but in contact with the material adjacent thereto, for the purpose set forth.

58. In a machine of the character set forth, the combination of means for advancing a support upon which the slab is to be formed and to which slab-forming material is supplied, and kneader mechanism for kneading the material comprising a kneader-element movable into and out of contact with the material, means operating to move said element in the direction of travel of said support, over the material and in contact therewith, and to move said element in the opposite direction out of contact with the kneaded portion of the material, but in contact with the material adjacent thereto, for the purpose set forth.

59. In a machine of the character set forth, the combination of means for advancing a support carrying a slab formed with a projection on its upper surface, and means for brushing the upper surface of the slab, comprising a plurality of brush devices adapted to engage different parts of the slab, one of said brush devices being in line with the projection on the slab and being mounted to adapt it to be raised and lowered relative to said projection, and means operating automatically to cause said last-referred-to brush to be raised when said projection is beneath it and lowered upon the slab after said projection has passed beyond this brush device.

60. The method of manufacturing slabs, or the like, of cement, or the like material, which consists in moving the slab-forming material while positioned on a support, in engagement at its upper portion with a member and applying force to the upper portion of the material from a source other than the moving support and other than the force operating to supply the material to the support, to a degree sufficient to cause the upper portion of the material to move in the direction of movement of the support, against said member, at a speed greater than the speed of movement of the support.

61. The method of manufacturing slabs, or the like, of cement, or the like material, which consists in applying a layer of cement, or the like material, to a movable support, compacting the cement material applied to said support, applying reinforcing material to the upper surface of said layer, embedding the reinforcing material in said layer, spraying the upper surface of the cement material with moisture, applying a second layer of cement, or the like, to said first-applied layer, and compacting said second layer.

62. The method of manufacturing slabs, or the like, of cement, or the like material, which consists in applying a layer of cement, or the like, to a movable support, applying reinforcing material to the upper surface of said layer, pressing the reinforcing material into said layer, spreading the cement material to embed the reinforcement therein, applying a second layer of cement, or the like, to said first-applied layer, and compacting said second layer.

63. The method of manufacturing slabs, or the like, of cement, or the like material, which consists in applying a layer of cement, or the like, to a movable support, with a projection formed on the upper surface of the layer, compacting the cement material of this layer, removing a portion of said projection, applying a second layer of cement, or the like, to said first-applied layer, and forming a projection thereon coincident with the first-formed projection, compacting the second layer, and removing a portion of said projection.

64. The method of manufacturing slabs, or the like, of cement, or the like material, which consists in applying a layer of cement, or the like, to a movable support, with a projection formed on the upper surface of the layer and a groove on its underside in registration with the projection, compacting the cement material of this layer, removing a portion of said projection, applying reinforcing material, to the layer of cement material to conform to the remaining portion of the projection, applying a second layer of cement, or the like, to said first-applied layer of cement material and forming a projection thereon with the remaining portion of the first-produced projection underlying it, compacting the second layer of cement material and removing a portion of the last-formed projection.

65. The method of manufacturing slabs, or the like, of cement, or the like material, which consists in moving the slab-forming material while positioned on a support and in compacted condition thereon, and rubbing the compacted material at its upper portion in the direction of movement of the latter.

66. The method of manufacturing slabs, or the like, of cement, or the like material, which consists in moving the slab-forming material while positioned on a support and in compacted condition thereon, and kneading the compacted material in the direction of movement of the latter.

67. The method of manufacturing slabs, or the like, of cement, or the like material, which consists in moving the slab-forming material while positioned on a support, and with reinforcement on its upper surface, and while in movement pressing the reinforcement at a plurality of spaced points in a direction to embed it in the material and simultaneously subjecting the reinforcement to a rubbing action between the said points.

68. The method of manufacturing slabs, or the like, of cement, or the like material, which consists in moving the slab-forming material while positioned on a support, with reinforcement embedded in its upper surface, applying moisture to the upper surface of the material to reduce its consistency, brushing the thinned material, and thereafter applying a second layer of cement, or the like, to the first-applied layer.

69. The method of manufacturing slabs, or the like, of cement, or the like material, which consists in moving the slab-forming material while positioned on a support, with reinforcement embedded in its upper surface, applying moisture to the upper surface of the material to reduce its consistency, brushing the thinned material and working surplus cement material into the thinned material, and thereafter applying a second layer of cement, or the like, to the first-applied layer.

70. The method of manufacturing slabs, or the like, of cement, or the like material, which consists in advancing a series of supports upon which the slabs are to be formed, applying a layer of cement, or the like, to the supports, compacting the cement material, and producing on its upper surface a projection extending lengthwise of the layer, removing a portion of the projection, applying reinforcing material to the layer of cement material, embedding the reinforcing material, applying moisture to the material to render the material contacting the reinforcement, of thinned consistency, brushing the cement material, applying a second layer of cement, or the like material to the reinforced first layer, compacting the second layer and producing a projection on the slab with the remaining portion of the first-produced projection underlying it and removing a portion of the last-named projection.

71. The method of manufacturing slabs, or the like, of cement, or the like material, which consists in advancing a series of supports upon which the slabs are to be formed, applying a layer of cement, or the like, to the supports, compacting the cement material, and producing on its upper surface a projection extending lengthwise of the layer, removing a portion of the projection, applying reinforcing material to the layer of cement material, embedding the reinforcing material, applying moisture to the material to render the material contacting the reinforcement of thinned consistency, brushing the cement material, applying a second layer of cement, or the like material, to the reinforced first layer, compacting the second layer for producing a projection on the slab with the remaining portion of the first-produced projection underlying it, kneading an upper portion of said second layer of cement material and removing a portion of the last-named projection.

72. The method of manufacturing slabs, or the like, of cement, or the like material, which consists in advancing a series of supports upon which the slabs are to be formed, applying a layer of cement, or the like, to the supports, compacting the cement material, and producing on its upper surface a projection extending lengthwise of the layer, removing a portion of the projection, applying reinforcing material to the layer of cement material, embedding the reinforcing material, applying moisture to the material to render the material contacting the reinforcement of thinned consistency, brushing the cement material, applying a second layer of cement, or the like material, to the reinforced first layer, compacting the second layer and producing a projection underlying it, removing a portion of the last-named projection, and spraying coloring material on the slab.

73. In a machine of the character set forth, the combination of means for advancing a support upon which the slab is to be formed, means for feeding cement material to said support, a member positioned to extend above said support, and means located beyond said feeding means, operating against the upper portion of the material on the support, for continuously forcing material against said member in the direction of movement of said support at a speed greater than the speed of movement of said support.

LEROY BAUMGARTL.